United States Patent
Bolding et al.

[11] Patent Number: 5,831,353
[45] Date of Patent: *Nov. 3, 1998

[54] MODULAR LINEAR MOTOR AND METHOD OF CONSTRUCTING AND USING SAME

[76] Inventors: Vance E. Bolding, 15375 Feldspar, Chino Hills, Calif. 91709; William M. Hallidy, 620 E. Laurel, Glendora, Calif. 91740

[*] Notice: The term of this patent shall not extend beyond the expiration date of Pat. No. 5,252,043.

[21] Appl. No.: 540,936

[22] Filed: Oct. 11, 1995

Related U.S. Application Data

[63] Continuation-in-part of Ser. No. 211,016, Oct. 17, 1994, Pat. No. 5,734,209.

[51] Int. Cl.$^6$ .................................................. H02K 41/02
[52] U.S. Cl. .............................. 310/12; 417/417; 417/418
[58] Field of Search ...................... 310/12, 112; 417/417, 417/418, 448, 416, 449

[56] References Cited

U.S. PATENT DOCUMENTS

| | | | |
|---|---|---|---|
| 4,760,294 | 7/1988 | Hansen | 310/13 |
| 5,049,046 | 9/1991 | Escue et al. | 417/411 |
| 5,179,306 | 1/1993 | Nasar | 310/14 |
| 5,193,985 | 3/1993 | Escue et al. | 417/53 |
| 5,252,043 | 10/1993 | Bolding et al. | 417/417 |

Primary Examiner—Thomas M. Dougherty
Assistant Examiner—Judson H. Jones
Attorney, Agent, or Firm—Higgs, Fletcher & Mack LLP; Bernard L. Kleinke

[57] ABSTRACT

The modular linear motor includes at least a pair of like stator modules and at least a pair of like mover modules. A stator module coupler interconnects the like stator module and has an axial length of sufficient dimension to maintain a given three phase stator pole pitch between the interconnected stator modules. A mover module coupler interconnects the like mover modules, and has another axial length of sufficient dimension to maintain a given mover pole pitch between the interconnected mover modules.

9 Claims, 7 Drawing Sheets

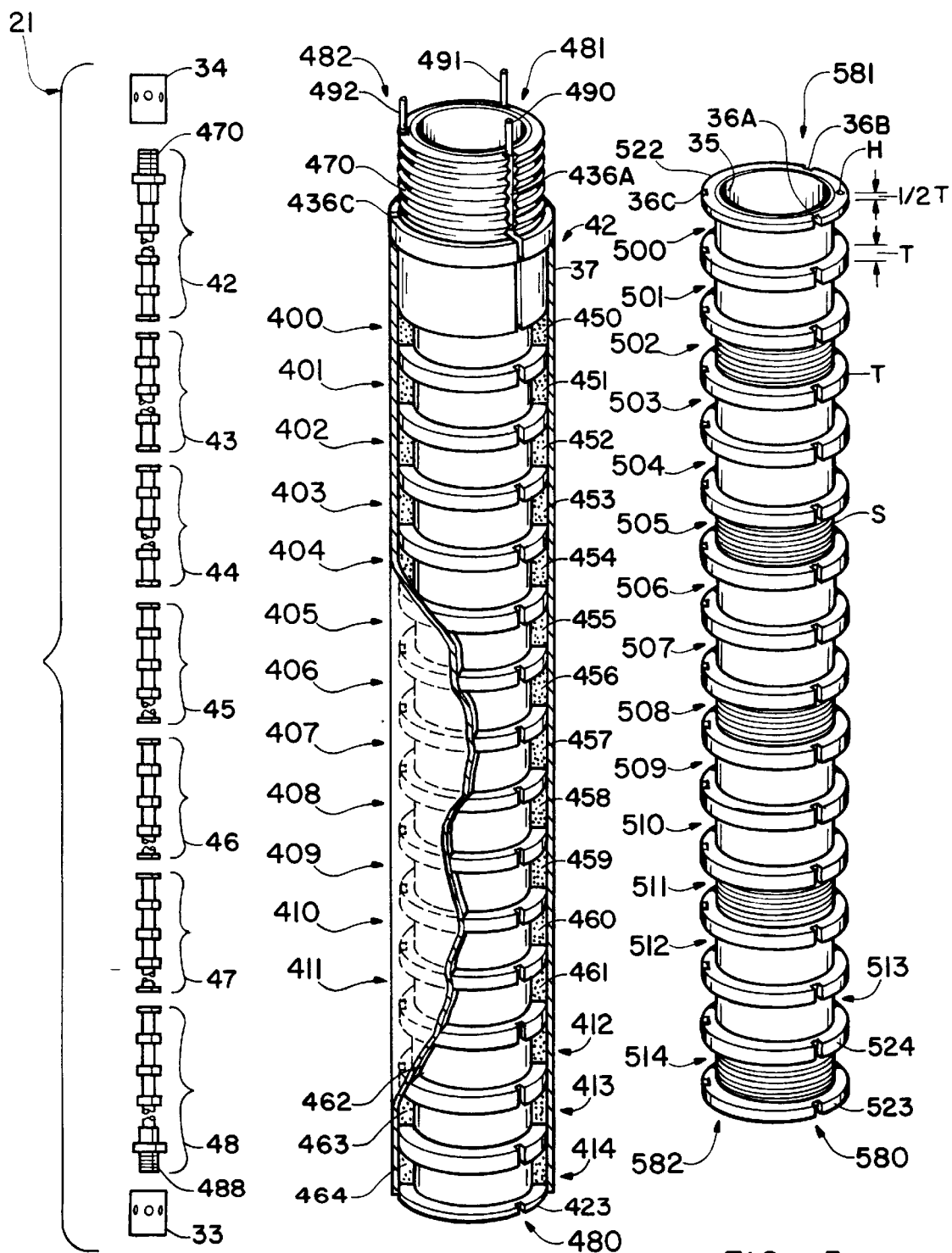

MODULAR LINEAR MOTOR AND METHOD OF CONSTRUCTING AND USING SAME

CROSS-REFERENCE TO RELATED APPLICATIONS

This application is continuation to U.S. patent application Ser. No. 07/462,833 filed Jan. 10, 1990 entitled "PUMP CONTROL SYSTEM FOR DOWN HOLE MOTOR PUMP ASSEMBLY AND METHOD OF USING SAME", now U.S. Pat. No. 5,049,046; and this application is also a continuation-in-part of U.S. patent application Ser. No. 08/211,016 filed Oct. 17, 1994, now U.S. Pat. No. 5,734,209, entitled "LINEAR ELECTRIC MOTOR AND METHOD OF USING AND CONSTRUCTING SAME," and which entered the national stage on Oct. 17, 1994 under 35 U.S.C. 371 based on International patent application No. PCT/US92/07779 entitled "LINEAR ELECTRIC MOTOR AND METHOD OF USING AND CONSTRUCTING SAME," filed Sep. 15, 1992, and which claims priority from U.S. patent application Ser. No. 07/760,748 entitled "LINEAR MOTOR-PUMP ASSEMBLY AND METHOD OF USING SAME," filed Sep. 16, 1991, now U.S. Pat. No. 5,252,043, which patents and patent application are incorporated herein by reference and which are owned by a common assignee.

TECHNICAL FIELD

The present invention relates in general to an improved linear motor and method of constructing it. The invention more particularly relates to a linear motor which may be adapted to be used at different well depths and which can be assembled in the field to provide a properly sized unit for a particular well application.

BACKGROUND ART

Crude oil generally occurs in nature as a mixture of oil, gases, water and small proportions of other elements. Thus, when a production well is first drilled, there is often times sufficient gas present at high pressure to force a column of fluid to the surface. In these instances it is only necessary to install the necessary equipment in the well and at the surface to control the flow from the well. Eventually, as gas and oil continue to be produced, the internal pressure within the well drops until it can no longer support a column of fluid to the surface and the well stops producing. Other wells, when they are first drilled, do not have sufficient pressure to flow the oil to the surface. In either situation, it is necessary to pump or otherwise bring the oil to the surface to produce it.

In anticipation of the necessity of pumping fluids to the surface when an oil well is first drilled, the well hole is lined with steel pipe known as well casing or just casing. The casing keeps the sides of the well from caving into the well and it establishes a high strength pressure boundary to contain the high pressures developed on high pressure wells. A cased well typically has several sizes of casing placed concentrically in the well starting with a larger diameter conductor pipe on the outside and with successively smaller casings on the inside. As the casing strings get successively smaller, they penetrate to successively deeper depths. The conductor pipe and the first few casing strings are cemented in place to establish a positive seal with the earth at the surface.

The innermost casing runs deep into the well below the depth where the oil sands are located. When it is desired to produce the oil the casing is perforated at the producing sand level to allow oil to flow into the well, from whence, it can be produced to the surface. Typically, the innermost casing is four to five inches in diameter with four inch casing being common in low volume wells.

A string of smaller tubing known as production tubing is suspended from the surface inside the casing and oil is normally brought to the surface through this tubing. A plug known as a packer is set in the interior casing below the production tubing to prevent the oil from flowing down the well into the uncased or "open" hole where it could be lost in the earth formations below. A second, annular packer may be placed in the well above the producing zone and the casing perforations to seal the annular space between the casing and the production tubing. This packer keeps the oil confined to the production tubing in high pressure free flowing wells. In low volume pumped wells, the annular packer may be omitted. In some cases, oil and gas separation will occur in the well and the gas is produced through the annular duct to the surface while the liquid oil is pumped to the surface through the production tubing.

Many different methods have been developed over the years to bring the oil to the surface in wells which are not free flowing. The most commonly used device for low volume wells is the sucker rod pump.

The sucker rod pump system consists of a pump placed at the bottom of the hole, a walking beam or pump jack at the surface, and a long rod known as a sucker rod, extending from the pump plunger at the bottom of the hole to the pump jack at the surface. The pump and the sucker rod fit inside the production tubing.

The sucker rod is stroked up and down by the pump jack and in turn strokes the pump plunger up and down to pump oil to the surface. The pump jack, being a large, slow moving mechanism, incorporates a large counterbalance on a bell crank to smooth the load variations between the up stroke and the down stroke on the driver.

While simple in concept, the sucker rod pump system is not without its drawbacks. One main drawback is the fact that the movement of the sucker rod in the production tubing during pumping operations produces wear between the sucker rod and the tubing. In this regard, the sucker rods must be periodically pulled from the well and checked for wear and the worn sections eventually replaced. Pulling a sucker rod from a well requires the use of a workover rig which is an expensive operation that reduces the profitability of a well. For this reason, well operators try to coordinate sucker rod maintenance with other maintenance such as pump replacement or repair. In marginal wells, the failure or replacement of major sections of sucker rods is often cause for completely closing a well.

An even more serious problem occurs when the sucker rod wears through the wall of the production tubing. In that case, the oil being pumped leaks through the tubing wall and back into the well via the annular space between the casing and the production tubing. When this occurs, it usually becomes necessary to remove the production tubing from the well and replace worn sections. The cost of this operation also oftentimes forces the closure of the well.

Therefore, it would be highly desirable to have a new and improved linear motor for use in a downhole pumping system that eliminates or greatly reduces sucker rod wear and production tube damage caused by a sucker rod.

There are many variations of the sucker rod pump to accommodate a wider range of field conditions however, they are all positive displacement piston pumps utilizing a stationary (standing) valve at the bottom of the pump housing (intake vales) and a traveling valve in the plunger (discharge valve). The valves used are simple stop valves and generally are of the ball type.

The stroke applied to the pump must fall within the stroke range of the pump. If the sucker rod goes too low at the bottom of its stroke, the pump plunger bottoms out on the pump barrel and will cause excessive wear on the pump and sucker rod parts. On the other hand, if the sucker rod goes too high at the upper end of its stroke, it will lift the pump off its seat in the bottom of the production tubing and will allow oil in the production tubing to drain past the pump and back into the well.

In order to prevent the sucker rod from going either too high or too low, the pump jack stroke is kept less than the stroke range of the pump. The amount of margin required is increased by other factors which reduce the certainty of the position of the plunger within its stroke limits in the pump. The production tubing will stretch in length by several inches when filled with oil. Likewise, the sucker rod will stretch when loaded on the upstroke and will contract when the load is removed near the down stroke position. The fluid inertial forces and fluid friction acting on the pump and tubing walls will induce dynamic loads on the sucker rod which are additive to the static loads previously described.

The effect of leaving a margin on the pump stroke is to reduce the swept volume or the volumetric efficiency of the pump. One bad effect of the reduced swept volume is that it can allow a gas bubble to develop in the suction chamber of the pump and prevent the low pressure liquid oil from entering into the suction cavity. This condition is termed gas lock and can be cause for having to pull the pump.

Therefore, it would be highly desirable to have a new and improved linear motor for use in a downhole pumping system that would cooperate with an associated downhole pump to greatly increase its swept volume and thereby eliminate or at least greatly reduce gas lock within the downhole pump.

Pump jacks are large structures located over the well which stroke the sucker rod up and down to operate the pump. A typical pump will be ten to fifteen feet long and will have an operating stroke of two or three feet less than the pump length. During the stroke the pump must handle the weight of the sucker rod plus the weight of the fluid column in the production tubing. At about 1½ pounds per foot, a sucker rod for a 3000 foot well will weight 4500 pounds. The fluid column will weigh about 1.1 pounds per foot for an additional 3,300 pounds or 7800 pounds load on the pump jack at the top of the sucker rod. The large stroke and forces make the pump jack an inherently large structure. The counter balanced bell crank, while smoothing the force input and power required to operate the unit, increase the pump jack's size.

The size of the pump jack structure is a drawback in the environmentally oriented society of today and it complicates the integration of oil production into other industrial needs. For example, oil wells are frequently found in agricultural areas and the large pump jacks interfere with irrigation and other machinery.

In urban areas, the large pump jacks once considered a sign of prosperity and industrial strength are now considered an eye sore and safety hazard by an increasingly larger section of society. They must be shielded from view at a large expense to the well operator.

Therefore, it would be highly desirable to have a new and improved linear motor for use with a downhole pumping system that can be easily integrated into other types and kinds of land settings without the use of large, bulky pump jacks and shields.

Because of the expense associated with repairing and maintaining low production wells, it is desirable to replace conventional sucker rod pump systems replaced with downhole linear motor driven pump systems.

In a downhole pumping system, such as disclosed in U.S. Pat. Nos. 5,049,046; 5,179,306; 5,193,985; and 5,252,043 which are incorporated herein by reference as though fully set forth, a brushless direct current linear motor is coupled to a pump and placed at the bottom of the production tubing as a unit. Power to the pump is provided by a motor controller on the surface via a cable in the production tubing. The cable is a strengthened cable so that it can be used to lower the pump and motor unit into the well and to retrieve it back to the surface. The motor/pump unit is designed to be lowered into a well inside the production tubing until the pump seal on the pump seats in a seating nipple at the bottom of the production tubing. This arrangement allows the motor/pump unit to be installed as a direct replacement for a sucker rod pump without modifying the existing well tubing string. The oil is pumped through the center of motor and the production tubing. Much of the heat developed by the motor is thus carried away in the produced oil.

Two recent advances in electromagnetic technology have made the linear brushless direct current motor more feasible and competitive with pump jack units. First has been the commercial availability of high magnetic strength, rare earth magnets at relatively low costs. Such magnets are ideally suited to downhole applications since they are generally inert to the downhole environment and their high magnetic intensity is sufficient to enable a linear motor to produce a required thrust to lift a column of fluid. The development and investment in production techniques for such magnets has reduced their cost in quantity to a small fraction of their costs only a few years ago. Second, solid state power switching devices and digital control logic have reached a stage of development which make it practical to synthesize electrical power at the controlled voltages, amperes and frequencies necessary to drive a linear motor at desired production speeds. In this regard, virtually all necessary electrical components can be purchased as off the shelf items for easy assembly into a functional motor controller.

In a downhole pump system, the linear motor and pump are connected together by hard couplings between the motor stator and the pump housing and between the motor mover and the pump plunger.

The pump is placed below the motor which allows the use of conventional pump seals at the lower end of the pump and a conventional seating nipple at the lower end of the production tubing. This arrangement also provides direct electrical access to the linear motor at the top of the motor/pump assembly. To place the pump above the motor would require that the electrical power be brought to the motor through the pump or around the pump. Either choice would complicate the pump design seriously.

The pump which attaches to the linear direct current motor operates like the sucker rod pumps currently in use. The plunger seals against a sleeve bore with a metallic seal. As the plunger is lifted, the oil above the plunger is lifted up into the production tubing. The sleeve bore below the plunger is evacuated by the upward movement of the plunger and thus well fluid is drawn into the sleeve cavity (suction chamber) through a stop valve. When the plunger reaches the top of its stroke, the motor reverses and drives the plunger down. The well fluid in the sleeve cavity is trapped between the plunger seal and the stop valve at the bottom of the pump. The stop valve allows fluid to flow into the suction chamber but blocks flow out of the chamber hence the fluid trapped in the suction chamber is forced up the plunger bore and up through the traveling stop valve in the upper end of the plunger. At the bottom of the stroke, the motor reverses direction and the pumping cycle is repeated.

While such a pumping arrangement is sufficient for a fixed volume and pressure capacity of a given well, it would be highly desirable to provide a means to adjust the pump for different volume and pressure capacity to meet the needs of different wells.

Although the concept of a downhole pump driven system has been successful for some applications, it would be highly desirable to have a new and improved downhole pump driven system which is much less expensive, that can be adapted for different well applications, and that can be conveniently and easily assembled in the field.

One problem associated with downhole systems is that the pump plunger is hard coupled to the motor mover and hence must be moved in unison with the mover. In this regard, the mover must have a precisely controlled stroke which extends to the pump stroke. However, to meet the needs of different wells, different pumps are required to adjust for different volume and pressure capacities. Thus, while it is possible to design a motor for a given pump, of a given volume, at a given depth, the cost of manufacturing, shipping and assembling such a system is very expensive.

Therefore, it would be highly desirable to have such a new and improved linear motor that is so constructed that it can be adapted for use with different pumps. Such a motor should maintain the same operating stroke independent of the motor size. Moreover, such a motor should be so constructed to be easily adapted to increase its force producing capability. Such a motor should be easily assembled in the field by personnel with limited training.

The environment in the well itself is a critical factor to be reckoned with in the design and selection of equipment to operate downhole. The most critical parameters are the downhole pressure and temperature, the gas-oil-water ratio, the corrosion of materials used downhole, and the lubricity of the fluids in the well.

The pressure developed in a well is dependent on the well depth and the specific gravity of the well fluids being pumped to the surface. Well depths range from a few hundred feet to over twenty thousand feet, however, the majority of wells are less than five thousand feet deep. The fluid specific gravity ranges from about 0.75 to 1.025. This equates to a pressure gradient range from the surface to the bottom of the well of 0.325 to 0.444 psi per foot of well depth. At 5,000 feet, these pressure gradient limits represent 1,625 psi and 2,220 psi respectively. In many wells, some water is pumped with the oil. The higher the ratio of water to oil in the mixture, the closer the gradient will approach the higher limit.

Since the maximum pressure is at the bottom of the well, the pump and the linear motor will be operating in a fluid at that pressure. The well tubing must withstand an internal pressure equivalent to the maximum pressure. The pump will likewise be subjected to equal or higher internal pressures. Electrical components, if any, must be sealed to prevent high pressure fluid intrusion and resultant breakdown of insulator dielectric properties.

Therefore, it would be highly desirable to have a new and improved linear motor that is so constructed to prevent high pressure fluid intrusion at well depths of up to twenty thousand feet.

Temperature at the bottom of the well is typically elevated above the surface temperature but the amount is subject to wide variation. A crude rule of thumb for general design is that the temperature at depth is the mean annual surface temperature in degrees Fahrenheit plus one degree per 100 feet in depth. In temperature climates, the mean annual temperature can be taken as 60 degrees Fahrenheit. Using the rule of thumb, the temperature at 5,000 feet in a temperature climates, would be 110 degrees Fahrenheit.

From a practical design standpoint, motor materials should be selected based on a 300 degree Fahrenheit operating temperature. In this regard, the maximum allowable well temperature equates to the maximum motor operating temperature less the temperature rise in the motor. From the foregoing, it should be understood, for example, that a 100 degree Fahrenheit temperature rise in the motor coils will limit the well temperature to 200 degrees Fahrenheit.

Therefore, it would be highly desirable to have such a new and improved linear motor that is so constructed to operate in wells having downhole temperatures of up to 200 degrees Fahrenheit.

The make-up and chemistry of oil well fluids varies widely and is still a subject of much research. The water from a well typically contains dissolved salts and minerals which make the well fluids an electrolyte which supports galvanic corrosion and function as an electrical conductor as well so as to provide a potential short circuit to any exposed electrical circuitry. Also, the lack of free oxygen downhole, in some cases, will enhance pitting corrosion in those materials subject to this phenomena. A third potential hazard in the downhole environment is the buildup of solids on the equipment surfaces from the precipitation of various salts out of solution that attach themselves to equipment components as solid deposits.

Also, hydrocarbons that vary widely between different geological areas can produce detrimental elements such as paraffin and sulfur. The paraffins form deposits on metallic surfaces making it difficult to install and remove equipment as well as interfere with equipment operation. Sulfur and hydrogen can also combine to form hydrogen sulfide, a toxic compound which attacks the grain boundaries of vulnerable materials.

The lubricity of the well fluids also becomes important to the life of equipment pumping it. Both linear reciprocating pumps and linear motors have sliding contact between surfaces. Sliding contact requires some type of film lubricant to reduce the wear rate of the components to an acceptable level. Water by itself has poor lubricity; however, even small amounts of oil emulsified in the water will improve the lubricity of the mixture.

Therefore, it would be highly desirable to have a new and improved downhole pumping system that can operate reliably in the hostile downhole environment. Such a system should be able to pump liquids at various lubricity levels, and should not easily corrode.

Another problem associated with down hole pumping systems is related to the construction of the linear motor. In this regard, because the motor must be sufficiently small in diameter to be raised and lowered in the production tubing of the well, the motor must necessarily be very long in order to develop the necessary thrust for lifting fluid thousands of feet. Such a motor is typically 20 to 30 feet in length.

Assembling such a long motor is very difficult and expensive. For example, assembly of the motor requires large working areas with very large expensive tooling and fixtures. Moreover, the winding of the coils on such a motor stator can only be done by one or two persons and thus, production is slow and expensive. Assembling of the permanent magnets as such a motor is also a very slow and tedious process and typically can only be done by one person. Thus, the problem with slow and expensive production is compounded.

As noted earlier, wells have different production capacities. Therefore to meet the production capacities of different wells the linear motor must be specially constructed to produce different thrust capacities. Manufacturing such customized motors results in expensive custom tooling, special engineering, and manufacturing processes.

Therefore, it would be highly desirable to have a new and improved linear motor that could be assembled easily and relatively inexpensively. Such a motor construction should lend itself to increase production, easy storage and application to a wide variety of different production capacity wells.

DISCLOSURE OF INVENTION

Therefore, the principal object of the present invention is to provide a new and improved linear motor and a method of constructing it, wherein the motor can be readily and conveniently assembled in the field and integrated with a suitable downhole pump to meet individual well requirements.

Another object of the present invention is to provide such a new and improved linear motor and method of constructing it so that manufacture and assembly of the motor for use in the downhole pumping system can be completed in the field in a relatively inexpensive manner.

Briefly, the above and further objects of the present invention are realized by providing a new and improved modular linear motor which can be assembled in a convenient manner according to a novel construction method of the present invention.

The modular linear motor includes a plurality of substantially like mover modules and substantially like stator modules which are assembled relative to one another for developing desired thrust parameters to meet the production needs of any one of a large number of different wells.

Each stator module includes a yoke, a pair of spaced apart end connectors, a set of five identical center stator teeth segments, upper and lower end stator teeth segments having oppositely threaded nipples respectively for engaging one or the other of the end connectors to join threadably the stator modules into a stacked stator assembly unit, and a set of stator coils mounted on the stator teeth segments and connected electrically in a three phase Y configuration. When assembled, each stator module is potted enabling modules to be quickly and easily replaced in the field.

Each mover module includes a plurality of elongated like mover segments each having a plurality of equally spaced apart pairs of oppositely poled permanent magnets disposed between and equally spaced apart from a pair of like poled permanent magnets for generating a plurality of equally spaced apart pairs of oppositely poled magnetic flux field. A coupler disposed between the pairs of like poled permanent magnets mechanically interconnects the mover segments together to define the axial length L of the mover. The coupler has a longitudinal dimensioned substantially equal to l for spacing the pairs of like poled permanent magnets a sufficient distance to help maintain mover pole pitch throughout the entire axial length L of the mover module.

A coupling arrangement for mounting a sucker rod pump to the base of the motor so that the pump stroke of the pump is controlled precisely over a very short stroking distance to substantially increase the volumetric efficiency of the pump.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 3 is a diagrammatic assembly view of a stator module of FIG. 2;

FIG. 4 is a greatly enlarged diagrammatic cut away view of an end stator segment of the stator module of FIG. 3;

FIG. 5 is a greatly enlarged diagrammatic view of a portion of a partially wired center stator segment of the stator module of FIG. 3;

BEST MODE FOR CARRYING OUT THE INVENTION

Figures 1, 2:
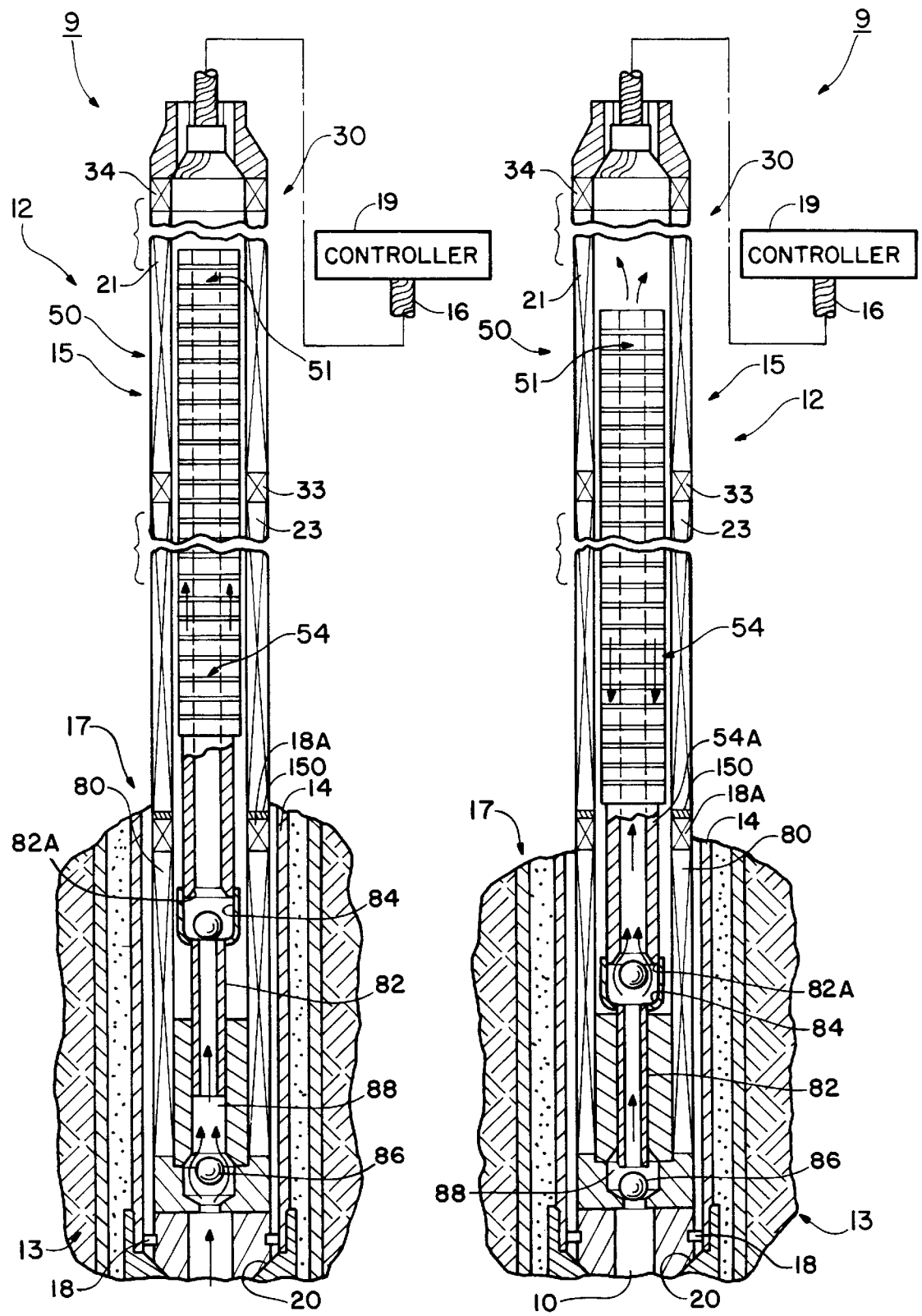
FIG. 1 is a schematic vertical sectional through a well showing in elevation a motor-pump system which is constructed in accordance with the present invention, illustrating a pump in a fluid receiving position.
FIG. 2 is a schematic vertical section through the well of FIG. 1, illustrating the pump in a fluid lifting position.

Referring now to the drawings, and more particularly to FIGS. 1 and 2 thereof, there is shown a downhole motor-pump control system 9 for removing well fluids 10 from below the ground surface.

The motor-pump control system 9 generally includes a motor-pump assembly 12 having a positive displacement piston pump 13 for forcing the well fluids 10 into a well production tube 14, and a brushless direct current linear motor 15 for driving the pump 13 reciprocatively to allow the fluids in the production tube 14 to be lifted to the upper ground level. The system 9 further includes a motor controller 19 at ground level for controlling the reciprocative action of the linear motor 15 and a power cable 16 which extends between the motor controller 19 and the motor 15 for sending electric power downhole and for helping to raise and lower the motor-pump assembly 12.

The motor controller 19 disposed at the ground level supplies the motor 15 with a certain number of direct current pulses for causing the motor 15 to drive or stroke the pump 13 reciprocatively. The controller 19 is connected to the motor-pump assembly 12 via the reinforced cable 16 that enables the assembly 12 to be raised or lowered within the production tube 14.

A coupling arrangement, indicated generally at 17 enables the pump 13 to be connected mechanically to the base of the motor 15 so that the pump stroke of the pump 13 is controlled precisely over a short pump stroking distance of about 24 inches to substantially increase the volumetric efficiency of the pump, which in turn, greatly reduces the risk of gas lock in the pump 13.

The coupling arrangement 17 connects the pump 13 and the motor 15 together to form the motor-pump assembly 12. The assembly 12 is adapted to be lowered into a well inside the production tube 14 until the pump 13 seats sealingly in a pump seating nipple 20 at the bottom of the production tube 14. This arrangement allows the assembly 12 to be installed as a direct replacement for a conventional sucker rod pump without modifying the existing well tubing string.

As best seen in FIGS. 1 and 2, the pump 13 is placed below the motor 15 to permit the use of the conventional pump seals 18 disposed on the lower end of the pump 13 and the conventional seating nipples 20 disposed on the lower end of the production tube 14.

As will be explained hereinafter in greater detail, the motor 15 has a modular construction that includes at least one modular cylindrically shaped stator, indicated generally at 30 (FIG. 1), having a plurality of substantially like interconnected stator modules or units 21 and 23 and at least one modular cylindrically shaped mover, indicated generally at 50 (FIG. 7) having a plurality of substantially like interconnected mover modules or units 51–54. Each of the stator modules 21 and 23 are interconnected in a stacked arrangement by a coupler, such as a coupler 33. Each of the mover modules 51–54 are interconnected in a stacked arrangement by couplers 55–57. Each of the stator modules 21 and 23 have a centrally disposed bore, such as a bore 70 in module 21 that is dimensioned for receiving freely a portion of the mover 50. In this regard, the stator 30 coats electromagnetically with the mover 50 causing the mover 50 to travel reciprocatively rectilinearly within the respective bores of the modules 21 and 23 which extend coaxially throughout the entire axial length of the stator 30 to define a mover path of travel.

It should be understood by those skilled in the art that any desired numbers of stator modules and mover modules may be employed to increase the thrust of the motor. In this manner, the modular construction of the motor 15 enables it to be easily assembled in the field to meet the production needs of any one of a large number of different wells. The modular construction also enables field repair in a fast and efficient manner.

In order to discharge the well fluids 10 into the production tube 14, the well fluid 10 is pumped through the center of the motor 15, thus, enabling much of the heat generated by the motor 15 to be dissipated into the well fluid 10. In this regard, each of the mover modules 51–54 includes a centrally disposed bore, such as a bore 79 (FIG. 7) that allows fluids to pass through the motor 15.

Considering now the stator module 30 in greater detail with reference to FIGS. 1–5, the stator module 30 defines a rectilinear path of travel to be followed by the mover module 50. The stator modules 21 and 23 are interconnected by a stator module coupling, such as the module coupling 33 that helps space apart the units 21 and 23 so that stator pole pitch is maintained throughout substantially the entire axial length of the stator 30. As each of the stator modules 21 and 23 are substantially identical, only stator unit 21 will be described in greater detail.

Considering now the stator unit 21 in greater detail with reference to FIGS. 3–5 and 5A, the stator unit 21 generally includes five substantially identical inner or center segments 43–47 (FIG. 3) and two unique end segments 42 and 48, respectively, and a plurality of equally spaced apart pairs of oppositely wound toroidal coils such as the coils 400 and 401, which extend along substantially the entire axial length of the unit 21. Each pair of oppositely wound coils generate a pair of magnetic fields having opposite polarities. For clarity purposes and to permit a better understanding of the assembly process of the stator module 21, the segments in FIG. 3 are shown without their windings or outer yokes.

The stator coils are electrically connected in a three phase "Y" configuration and are excited by a direct current pulse which may be positive, null or negative. By applying the appropriate polarity to each phase of the three phase windings, a train of toroidal magnetic fields three coils wide and of alternating polarity are established along the axial length of the stator unit 21.

As will be explained hereinafter in greater detail, one half of each magnetic field is contained within individual ones of a plurality of spaced apart stator teeth T (FIG. 5A) extending along the axial length of the stator unit 30 and a thin walled iron tube, such as a tube 35 (FIG. 5A) interconnecting the stator teeth along their inside diameters. The other half of each magnetic field is contained in an individual one of a plurality of permanent magnets M (FIG. 8) disposed along the axial length of the mover module 50 and a solid iron rod or shaft 69 extending the axial length of the mover module 50. In this regard, those skilled in the art will understand the stator modules 21 and 23 the mover module 50 are integrally magnetically linked together by the aforementioned series of magnetic fields.

A thin iron tube or yoke 37 (FIG. 8) protects the outside of each tooth in the stator module 21 to help shield the stator windings or coils from the outside environment and to provide an extending magnetic path between the coils and the iron wall of the production tube 14 adjacent to the stator module 30.

The mover module 50 is made to move rectilinearly reciprocatively along the path of travel defined by the stator modules 21 and 23 by the controller 19 switching the polarities of the pulses supplied to the windings so that the magnetic fields are shifted in sequence along the axial length of the stator. In this regard, the mover module 50 moves with the magnetic field shifts to maintain polarity alignment. The speed of the mover module 50 is controlled by the controller 19 and is directly proportional to the rate the controller 19 switches the polarity of the magnetic fields.

In order to help seal and protect the windings within the yoke 37, the stator units 21 and 23 also include a pair of threaded end members, such as end members 470 and 488 of stator unit 21 (FIG. 3). The end connectors 470 and 488 are adapted to engage opposite terminal ends of the yoke 37 and have opposite threads.

Considering now the stator module 21 in greater detail, the stator module 21 includes a total of N number of equally spaced apart slots, such as a slot S (FIG. 5) which extend along its entire axial length. The N number is about 105.

Figures 7, 8, 9:
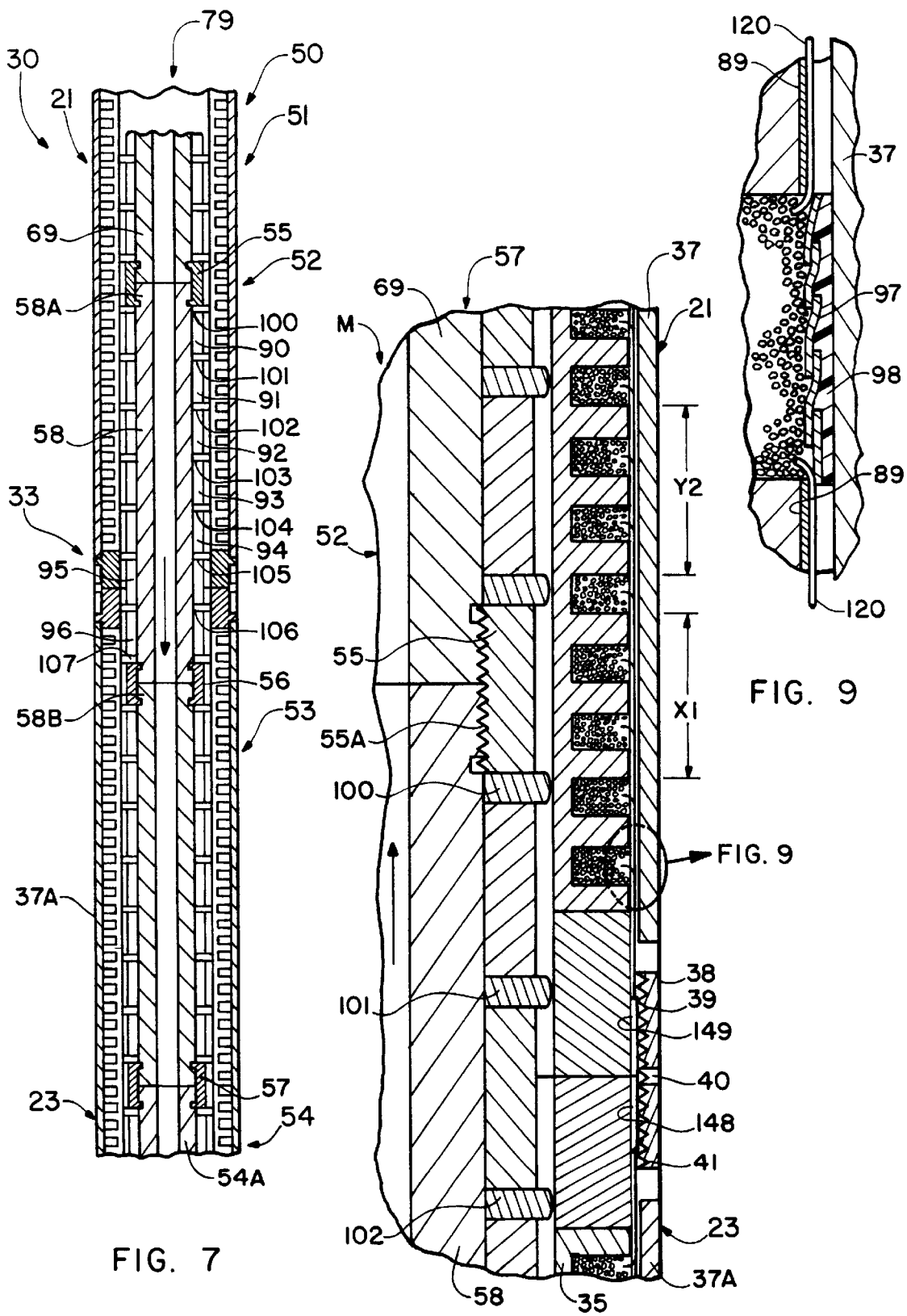
FIG. 7 is an enlarged fragmentary diagrammatic sectional view of a portion of the mover module of FIG. 2.
FIG. 8 is a greatly enlarged fragmentary sectional view of the stator and mover assemblies of FIG. 7.
FIG. 9 is a greatly enlarged fragmentary portion of the stator segment of FIG. 8.
Figure 10:
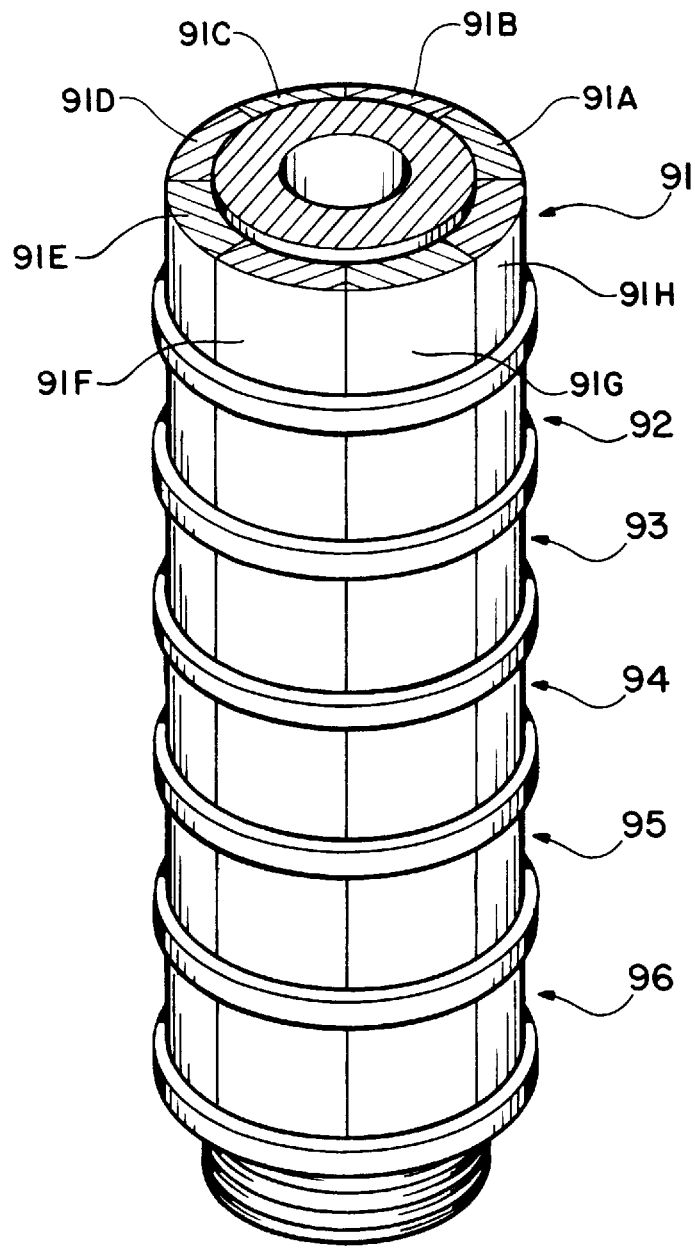
FIG. 10 is a greatly enlarged diagrammatic sectional view of a portion of a mover unit of the mover assembly of FIG. 7.

The slot pitch of the stator module 21 is one third the pole pitch of the stator module 21 which provides for three coils per pole or one coil per phase per pole. The module 21 is configured for fast and easy construction. In this regard, the stator teeth T are each ring shaped and are integrally connected to the tube 35. The teeth T are equally spaced apart and help define the individual ones of the slots S, together with the tube 35. This configuration enables the windings to be disposed within the slots S between the teeth T, the tube 35, and the yoke 37 (FIG. 4). In addition, once the windings have been wound in their respective slots, the windings are bonded with an insulating tape such as a tape 97 (FIG. 9), and then potted within their respective slots with an epoxy material, such as an epoxy material 98 (FIG. 9).

For assembly purposes, as best seen in FIGS. 4 and 5, 8 and 9 during the winding process, the root or tube portion, such as tube 35 forms the winding core on which the coils are wound. For coil forming purposes, a single wire is used in each module for each phase. In this regard, each stator tooth includes a set of three cutouts or wire-way slots, such as the wire-way slots 536A–536C. The wire-way slots are disposed equally spaced apart around the perimeter of their associated tooth at about a 120 degree separation from one another. There is a set of wire-way slots in each tooth of the stator module. In this regard, the slots, from tooth to tooth, align to form three wire-way channels, indicated generally at 580–582 respectively.

Each wire way slot and channel is adapted to receive a phase wire, such as the phase wire 120. In this regard, during the winding process, the phase wire 120 will pass along the periphery of each tooth along the entire axial length of its associated wire-way channel, such as the channel 580 and will be wrapped about each winding core associated with each phase A winding coils.

Utilization of individual wire-way slots provides two important advantages. First, during the formation of each phase coil, the phase wire passing down a given channel, such as the channel 580 as illustrated in FIG. 5, forms a repeating pattern that is easily observed. For purposes of illustrating such a pattern, the stator module in FIG. 5 is illustrated with its phase A windings only. Thus, the individual wire-way slots for each, phase wire help eliminate or at least substantially reduce coil wiring errors.

Another advantage of utilizing equally spaced apart wire-way slots is better distribution of heat, as the phase wires are spaced apart both axially and longitudinally throughout each stator module. Thus, insulation breakdown due to excess heat is substantially eliminated.

The independent wire way slot configuration for each phase also allows for good stator coil protection during stator unit assembly.

For ease in understanding the construction of the stator module, only a single wire-way channel is discussed. However, those skilled in the art will understand there are three independent channels 580–582, with one wire-way channel for each phase winding.

In order to provide protection from excessive wear, the teeth T and tube 35 are coated with a hard wear resistant insulative coating such as a coating 89 (FIG. 9). The inside bore through the center of the tube 35 is chrome plated to provide a smooth bearing engaging surface for the mover module 50 as will be explained hereinafter in greater detail.

Considering now the end segment 42 in greater detail with reference to FIGS. 3 and 4, the end segment 42, includes a given number of stator teeth to form a fixed number of coil receiving slots, such as coil slots 400–414. Each end segment tooth includes a set of three cutouts or wire-way slots, such as slots 436A and 436C. The slots are aligned from tooth to tooth along the entire axial length of the end segment 42 to form a set of wire-way channels, such as channels 480–482. In this regard, the aligned slots help define the channels 480–482 that extend the entire axial length of the segment 42. The end stator segment 42 also includes a set of coils or windings 450–464.

As best seen in FIG. 4, the phase wires that exit the top portion of the end segment 42 are coupled to a set of male connector pins, such as the pins 490–492 that are disposed in an externally threaded end portion 470 of the end segment. As best seen in FIG. 3, the threaded end portion 470 and the corresponding threaded end portion 488 of end unit 48 have opposite threads, one being a right hand thread and the other being a left hand thread. The opposite threading configuration thus assures proper assembly of the stator 30 regardless of the number of modules stacked in the stator.

Considering now the center segments of the stator module in greater detail with reference to FIGS. 3 and 5, each of the center segments, such as the center segment 43 also have a given number of stator teeth to form a number of coil receiving slots, such as the slots 500–514.

Figures 5A, 6:
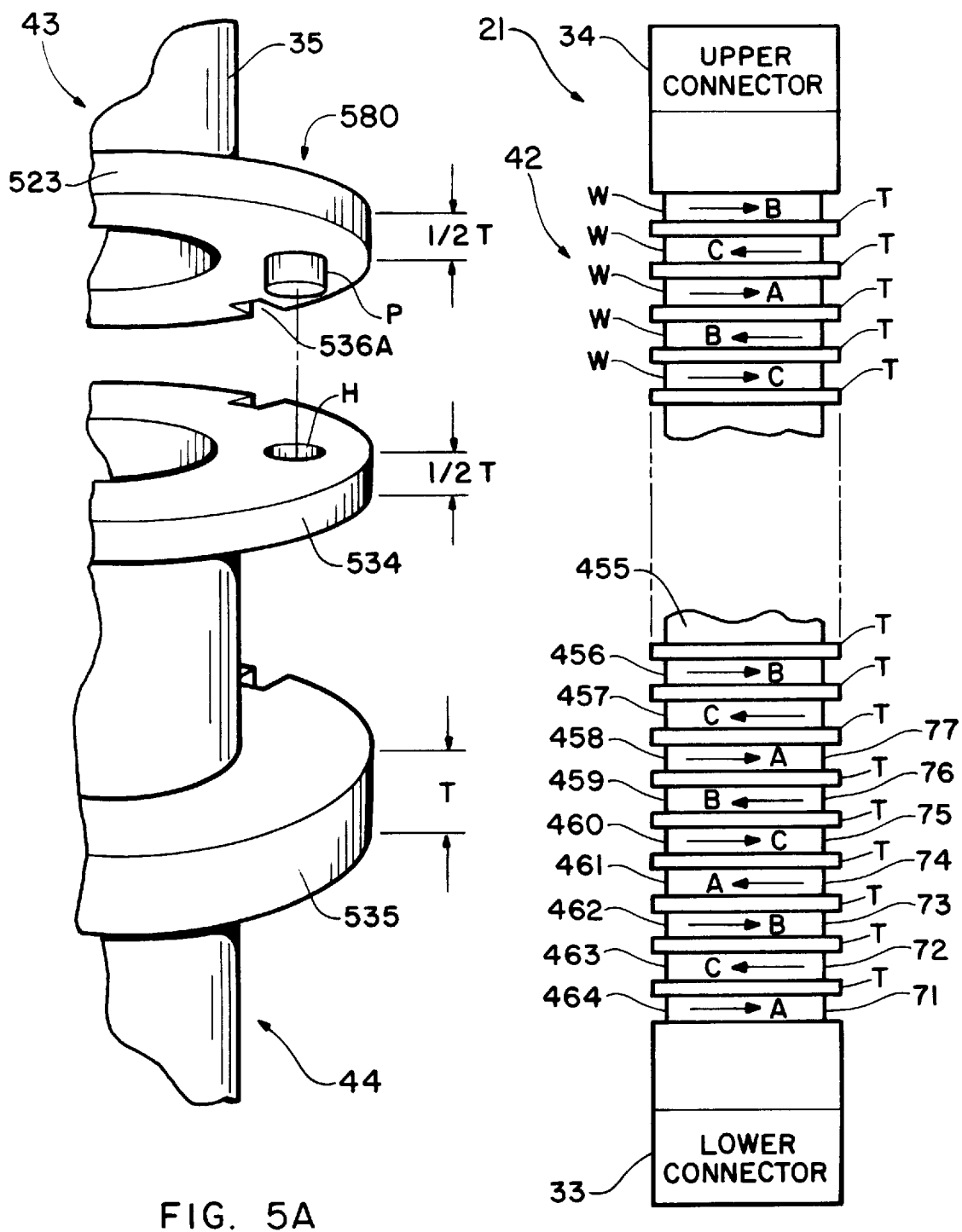
FIG. 5A is a greatly enlarged fragmentary diagrammatic view of the center stator segment of FIG. 5.
FIG. 6 is a greatly enlarged fragmentary diagrammatic view of the stator module of FIG. 3.

Each of the center segments, such as the center segment 43 includes a pair of spaced apart half width teeth, such as a pair of half width teeth 523, 534 which are disposed on diametrically opposite ends of the segment. In this regard, when a center segment such as segment 44 having a half tooth (½ T) 534 and a full tooth (T) 535 is abutted to an adjoining segment, such as a segment 43 as illustrated in FIG. 5A, two half teeth 523 and 534 will be abutted together to form a full tooth.

Each of the end segments, such as end segment 42 also terminate in a half tooth, such as a half tooth 423 (FIG. 5A) disposed on one end thereof so that when the end segment is disposed in abutting relationship with an associated inner segment, a full tooth will also be formed. Such full teeth have dimensions that correspond substantially to any full tooth in the stator module, such as the full tooth 524 in module 21.

Each segment includes an alignment pin, such as the pin P and pin receiving hole, such as a hole H (FIG. 5A) that prevents the segments 42–48 from rotating relative to another during the stator winding and assembly process.

From the foregoing, it should be understood by those skilled in the art that the construction of shorter segments 42–48 facilitates manufacture of the stator unit 21 because the individual segments are simpler to manufacture and easier to handle during plating and coating processes.

Considering now the winding process of the stator unit 21 with reference to FIG. 6, the stator windings or coils, such as coil W are made directly in the slots between the teeth T. Winding is accomplished in a cyclic order progressing from one end of the stator unit to the other end of the stator unit 21.

The first winding cycle begins with the first slot 71 on the terminal end of the stator unit 21. Slot 71 is wound with a phase A winding in a counter clockwise direction as viewed from the opposite end of the stator 21. The next winding is performed in the next or second slot 72 with phase C wire in a clockwise direction. The third winding is done using phase B wire in a counter clockwise direction in slot 73. The fourth winding is the second winding of phase A and is done in a clockwise direction which is in the opposite direction of the first winding in slot 74. The fifth winding is phase C in a clockwise direction in slot 75 and the sixth winding is phase B in a counter clockwise direction in slot 76. The winding cycle then repeats itself starting with phase A in the seventh slot 77 in a counter clockwise direction. The winding cycle continues through the one hundred and fifth slot 400.

The winding of each phase generates 35 total coils all on one continuous wire. There are no splices or joints between coils in any phase. The wire connection one coil of any selected phase, say phase A, with the next phase A coil is laid over the phase C and B coils placed between the two A coils. The crossing wires lay in their respective wire way slots such that all parts of the coils and the crossing wires are below the outside diameter of the stator teeth. The windings are wrapped with a layer of insulating material, such as the insulation material 97 (FIG. 9) and coated with epoxy, such as epoxy 98 to provide an electrical insulator and a thermal conductor between the coils and the steel yoke placed over the stator teeth.

As best seen in FIGS. 8 and 15, each phase wire in a given stator module, such as the phase wire 120 in stator module 21 terminates in a male connector pin at the top portion of the module and a female connector pin at the bottom portion of the stator module, such as a connector pin 148 and a female connector pin 149, respectively. The connector pins enable easy assembly between like stator unit, such as the stator modules 21 and 23.

A pair of spaced apart electromechanical connectors, such as the connectors 33, 34 (FIG. 3) are located at opposite ends of the stator unit 21 and are connected removably threadably to end segments 48 and 42 respectively. Both connectors 33 and 34 are keyed with a key way slot (not shown) so that they can be connected into the opposite connector of another stator unit i.e., the upper connector of one unit can be connected to the lower connector of any other like stator. By connecting stator modules together, a longer stator referred to as a stator stack may be used to generate more force. The higher force developed by a stator stack can be used to operate a larger pump to produce more volume or place the same pump at a deeper depth.

The connectors are designed to a precise mating length to maintain the pole pitch and phasing across the stator connections. If they are not, coupled movers will oppose each other and much of the motor thrust will be lost in axial stresses and heat in the stator and the mover.

A cable terminator connected to the cable 16 is equipped with a connector identical to the lower connectors on the stator modules. It can be connected to the upper connector 34 of the stator module 30.

Considering now the mover 50 in greater detail with reference to FIG. 7, the mover units 51–54 are coupled together by a series of spaced apart mover couplers 55–57. Each of the mover units 51–54 are substantially identical so only mover unit 52 will be described in greater detail.

Considering now the mover unit 52 in greater detail with reference to FIGS. 7–8, the mover unit 52 is an assembly that generally includes a mover shaft 58 having a pair of externally threaded end portions 58A and 58B respectively, a set of permanent magnets 90–96, a set of spaced apart bearing units 100–107. A pair of end couplers such as the couplers 55 and 56, respectively, enable the mover unit 52 to be coupled to be substantially like mover units 51 and 53 respectively. Each individual one of the permanent magnets 90–96 are generally ring shaped, radially polarized and are stacked on the shaft 58 in alternating polarities interleaved with individual ones of the bearing units 100–107.

Each permanent magnet, such as permanent magnet 91 is constructed of a plurality of small elongated segments, such as segments 91A–H which are secured together by an epoxy material (not shown).

Although in the preferred embodiment of the present invention each permanent magnet is described as being constructed from a plurality of elongated segments, it should be understood by those skilled in the art that such magnets can be constructed of a single ring or a plurality of smaller rings secured together by an epoxy material.

The bearing units 100–107 are generally ring-shaped having outside diameters that are dimensioned to allow the mover unit 52 to be received within the stator module 30. In this regard, the bearing units 100–107 centers the mover unit 52 in the stator module 30 and functions as a spacer allowing the mover unit 52 substantially free rectilinear reciprocative movement along the inner wall, such as the tube 35 of the stator module. The outside diameter of the bearing units 100–107 are sufficiently less than the inside diameter of the tube 35 to provide a sufficient radial clearance between the outside surface of the bearing units 100–107 and wall of the tube 35 to permit the well fluids 10 to form a lubricating film on the surface of the tube 35.

There is an odd number of permanent magnets 90–96 and an even number of bearing units 100–107 stacked on the mover shaft 58. In this regard, the two end magnets 90 and 96 have the same polarity. The magnets 90–96 and bearing units 100–107 are stacked on the shaft 58 and are secured thereto removably between the end couplers 55 and 56.

Those skilled in the art should understand the long bearing life is a critical factor relative to the ultimate utility of the motor downhole in the hostile environment of a well. In this regard, high contact stresses become major contributors to bearing wear and failure. In order to substantially reduce the magnitude of stress, the bearing units 100–107 share the total frictional stress by spacing the bearing units 100–107 between the respective magnets 90–96.

As best seen in FIG. 8, each end coupler, such as the end coupler 55 is an axial length $X_1$ that is dimensioned to be the same axial length $X_2$ of an individual one of the permanent magnets, such as a magnet M in mover unit 51. In this regard, as best seen in FIG. 8, when the two mover units are stacked and joined together, such as units 51 and 52 by the coupler 55, the magnetic polarity sequence is maintained throughout the axial length of the mover module 50. Thus, the units 51, 52 can be easily coupled together without special polarity orientation.

Considering now the mover shaft 58 in greater detail, the mover shaft 58 is composed of magnetic steel which is hollow throughout its entire axial length and externally threaded on both of its terminal ends. In this regard, the mover shaft 58 can be coupled to another mover module via a coupler, such as the coupler 55, or to the pump plunger 82 of pump 13.

Considering now the bearing units 100–107 in greater detail with reference to FIGS. 7 and 8, as each of the bearing units 100–107 are substantially identical only unit 101 will be described in greater detail.

Considering now the bearing unit 101 in greater detail with reference to FIGS. 7 and 8, the bearing unit 101 serves as a spacer between adjacent magnets during the assembly process. The bearing unit 101 also functions as a low friction contact with the interior of individual ones of the stator units holding the mover, such as mover unit 51 generally centered concentrically within the interior of the stator.

The bearing unit 101 is ring shaped having an outer surface or wall 63 that is generally crowned shaped to help facilitate the formation of a lubricating film between the bearing surface 63 and the interior wall of the stator module. The shape of the bearing unit 101 forms a gap 49 between the mover 52 and the stator 30 and also helps to compensate for any anomalies in the inside diameter dimensions of the tube 35 by maintaining the radial clearance between the mover 52 and the stator, such as the stator unit 30, to allow the mover 52 to be shifted off center by the magnetic attraction of the permanent magnets 90–96 to the iron in the stator 30. In this regard, the mover 52 is inherently unstable within the stator 30 and will be drawn to the nearest surface having the slightest anomaly in dimension. Due to the strength of the mover magnets 90–96, the magnitude of the force is quite large and the bearing units 100–107 surface is dimensioned to resist this force holding the mover 52 substantially centered at all times relative to the interior of the stator 30.

The bearing units 101 has a low coefficient of friction being composed of brass or carbon graphite. Downhole, the bearing unit 101 will be immersed in an electrolyte type fluid and must not react significantly with it chemically. Brass and carbon graphite both have similar galvanic potentials relative to steel so the transfer of material from the steel will be insignificant. Moreover, neither brass nor carbon graphite will absorb water or hydrocarbons. Carbon graphite being generally self lubricating, is the preferred material when the motor-pump unit 12 is utilized to remove well fluids with poor lubricity, such as water. Both brass and carbon graphite also have excellent wear resistance and compatible thermal coefficients of expansion for application in wells having high fluid temperatures.

Those skilled in the art will understand that thermal expansion must be relatively stable as the bearing unit 101 must maintain the necessary radial clearance over the entire expected temperature operating range of the motor 15. In this regard, if the bearing unit 101 overly expands, it will cause the lubricating surface to be lost or will permit the mover unit 52 to be seized in the stator 30. Bearing brass and carbon graphite have coefficients of thermal expansion that are sufficiently close to the thermal of expansion for the stator tube 35 to substantially prevent such breakdowns.

Considering now the permanent magnets 90–96 in greater detail, as each of the magnets 90–96 are substantially identical, only magnet 91 will be described in greater detail.

Considering now the magnet 91 in greater detail, the magnet 91 is composed of Samarium Cobalt and is configured in a plurality of segments 64A–H to form a ring shaped unit. The segments are retained in place by an epoxy material 68A–H having a temperature rating in excess of three hundred degrees Fahrenheit. Samarium Cobalt is not easily corroded and does not lose significant magnetism at elevated temperatures.

Considering now the mover couplers 55–57 in greater detail, as the couplers 55–57 are substantially identical, only coupler 55 will be described in greater detail.

Considering now coupler 55 in greater detail with reference to FIGS. 7 and 8, the coupler 55 is generally tubular in shape having a threaded internal wall 55A. The internal threaded wall 55A is adapted to be threaded engageably with either terminal end of a mover shaft, such as the threaded terminal end of shaft 69 and the threaded terminal end of shaft 58 for example. The coupler 55 functions as a stop to enable the permanent magnets and bearings to be stacked on the shaft 58 as previously described.

As best seen in FIGS. 1 and 2, the externally threaded end portion of the mover shaft, such as the threaded end portion of shaft 54A is adapted to engage threadably an internally threaded portion 82A of the traveling value 84. Thus, the mover 50 can be easily coupled to the pump 13.

In order to accommodate larger pumps those skilled in the art will understand that special couplers can be easily manufactured to couple the motor 15 to different sized pumps.

Figure 11:
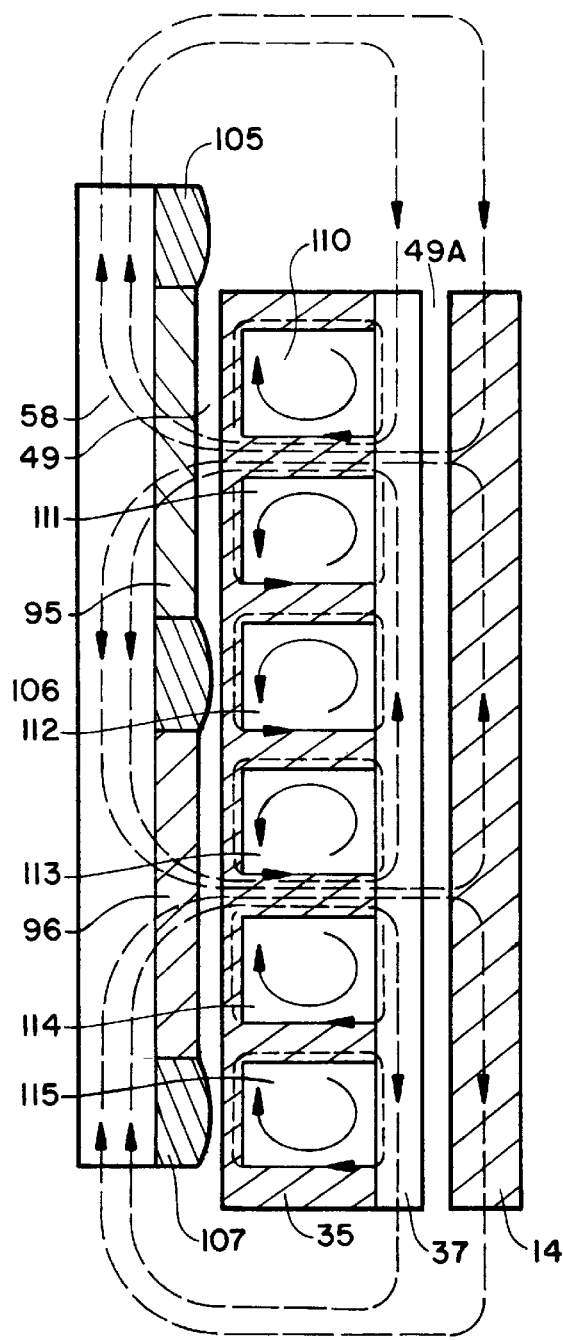
FIG. 11 is a schematic diagram illustrating the magnetic circuit of the motor of FIG. 2 in one position.
Figure 12:
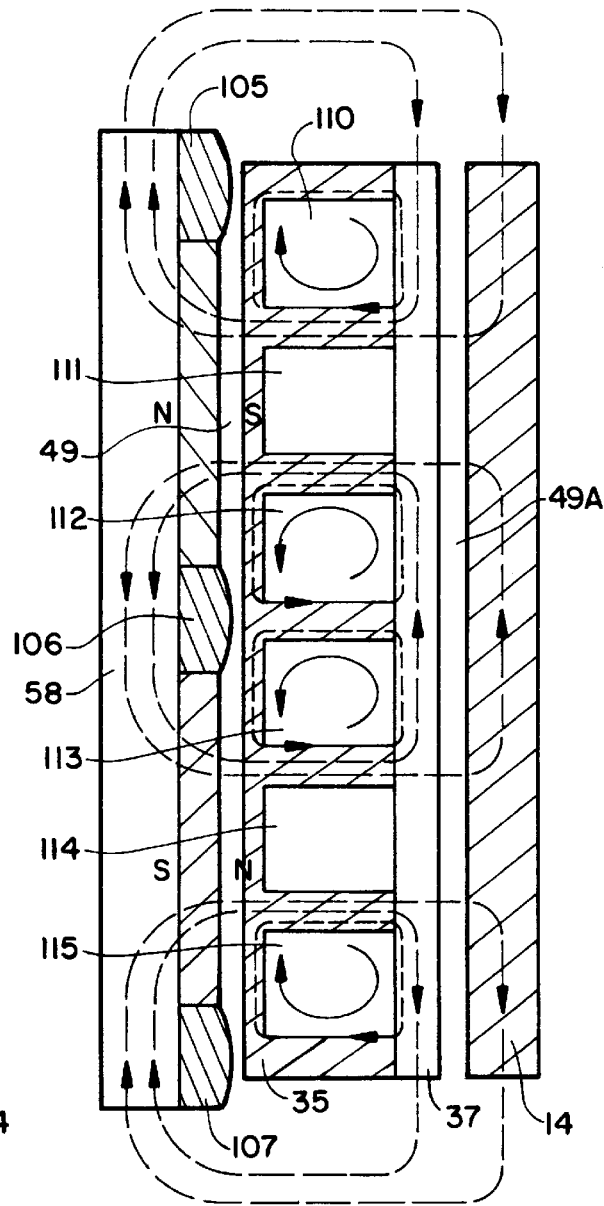
FIG. 12 is a schematic diagram illustrating the magnetic circuit of the motor of FIG. 2 in another position.

Considering now the operation of the motor 15 in greater detail with reference to FIGS. 11 and 12, the magnetic circuit is the mechanism by which electrical energy is converted to mechanical energy in an electrical motor. In the case of the linear motor 15, the interaction of the magnetic flux between the mover 52 and the stator 30 develops a mechanical thrust along the axis of motion.

The application of an electrical potential across the field windings develops a current in the windings such as the windings 450–464 and a corresponding magnetic field around the windings. Since the windings are ring shaped coils around the girth of the stator, the magnetic field formed is a series of toroidal shaped fields having alternate north and south polarity along the length of the stator as best seen in FIG. 12. The spacing of the toroidal fields along the stator 30 is identical to the spacing of the poles on the mover 50. When placed in the stator field, the mover 30 will shift along its longitudinal axis to align the poles on the mover 50 with the opposite poles of the stator field. Switching the stator field voltages in the proper order makes the stator field shift along the stator 30 one coil length at a time in the desired direction of travel. The mover 50 will move with the moving field to maintain the polar alignment.

Initially, with no amperage in the stator coils, the only magnetic field in the stator 30 is that induced by the mover magnets, such as magnets 90–96. The mover 50 is held in place by the mover side force induced friction force. When low amperage is applied to the stator coils, a magnetic circuit is established in the steel around the coils. The magnetic flux from adjacent same polarity coils circulates in a circular like path around the set of coils. It travels over the top of the coils in the yoke 37 in one direction to the last coil. There it crosses through the stator teeth to the stator inner tube 35. The inner tube 35 conducts the flux in the opposite direction of the yoke 37 to the first coil where the flux returns to the yoke 37 via the stator teeth. As the current is increased in the stator field coils, the flux density increase and quickly magnetically saturates the thin walled inner tube 35 of the stator teeth. As the thin walled inner tube 35 saturates, the magnetic flux jumps the gap 49 between the stator bore and the mover magnets 90–96.

In the mover 50, the flux path penetrates one mover pole magnet and into the mover shaft 58 where it turns and travels in the shaft wall, under the bearing and back out of the mover through the opposite pole magnet. In the stator 30, the magnetic flux path is through the stator teeth to the yoke 37 and then returns through the yoke 37 to the stator teeth on the other end of the coil set where the circuit trace started. As the stator field current continues to increase, the flux density continues to increase and the thin walled yoke 37 begins to saturate. When that happens, the magnetic flux will jump the air (fluid filled) gap 49A between the motor yoke 37 and the production tubing 14. The production tubing 14 becomes part of the motor back iron and is a parallel path to the yoke 37. By using the production tubing 14 as back iron, the motor back iron is minimized to allow the maximum amount of space of magnets such as the magnets 90–96 and coils, such as the coils 110–115. This maximizes the magnamotive force of the space available within the production tubing 14.

The linear brushless direct current motor 15 works by developing a train of alternating north, south, north, south poles along the length of the stator 30 and then shifting the poles along the stator 30 one stator slot at a time by switching the excitation of the three phase windings between positive, null, and negative in a preselected order. It was noted previously that the electrical phases are wound on the stator in the order and direction of A(+), C(−), B(+), A(−), C(+), B(−), A(+), and so forth where (+) means wound counter clockwise on the stator and (−) means wound clockwise on the stator as viewed from the upper end of the stator. The stator coils of each phase are connected in series between the voltage input lead and the "Y" connection at the other end. All phases are connected together at the "Y" connection via a pin connector 150 (FIG. 13) which is at null relative to ground. The pin connector 150 is adapted to be received within the pump unit connected to the lower end segment of the stator module, such as module 23 which, in turn, is adapted to be received within the pump unit 13.

Each phase can have a positive, negative or null voltage applied to its lead by the circuit controller. The controller provides a voltage signal to all three phases simultaneously while observing:

(1) There is always at least one positive direct current phase voltage and one negative direct current voltage. The third phase may be positive, null, or negative. Only one phase at a time can be switched.

(2) The current through the stator coils is constant. When one phase is positive, another negative, and the third null, the positive and negative phase will each be carrying the full current. In other words, two phases will be at maximum magnamotive force (amp turns) while the third is at null. When all three phases have applied voltage, the two phases having the same sign will each carry one-half the current while the third phase will be of opposite sign and will carry the full current.

Starting with an initial switch setting of Ea(+), Ec(−), and Eb(+) volts; the current imposed on the corresponding winding will be Ea(+)/Ra=Ia(+) and similarly Ib(+) and Ic(−). Combining the direction of the windings with the direction of the current defines the polarity of the magnetic field in accordance with algebraic laws of sign convention for multiplication. The magnetic fields for the first through sixth coil thus formed are:

$$F1=f[A(+),Ia(+)]=MMF1(+)$$

$$F2=f[C(-),Ic(-)]=MMF2(+)$$

$$F3=f[B(+),Ib(+)]=MMF3(+)$$

$$F4=f[A(-),Ia(+)]=MMF4(-)$$

$$F5=f[C(+),Ic(-)]=MMF5(-)$$

$$F6=f[B(-),Ib(+)]=MMF6(-)$$

$$F7=f[A(+),Ia(+)]=MMF7(+)$$

$$F8=f[C(-),Ic(-)]=MMF8(+)$$

$$F9=f[B(+),Ib(+)]=MMF9(+)$$

$$F10=f[A(-),Ia(+)]=MMF10(-)$$

$$F11=f[C(+),Ic(-)]=MMF11(-)$$

$$F12=f[B(-),Ib(+)]=MMF12(-)$$

The resulting combined Emf's form a wave along the mover from the first to the twelfth coil. Phase C is carrying the full stator current, while phase A and B are sharing the current, each carrying one-half the motor current. The number of turns per coil are the same, hence the Magnamotive force generated by a coil is proportional to the current.

Performing the first switching function, Ia=0

$$F1=f[A(+),Ia(0)]=MMF1(0)$$

$$F2=f[C(-),Ic(-)]=MMF2(+)$$

$$F3=f[B(+),Ib(+)]=MMF3(+)$$

$$F4=f[A(-),Ia(0)]=MMF4(0)$$

$$F5=f[C(+),Ic(-)]=MMF5(-)$$

$$F6=f[B(-),Ib(+)]=MMF6(-)$$

$$F7=f[A(+),Ia(0)]=MMF7(0)$$

$$F8=f[C(-),Ic(-)]=MMF8(+)$$

$$F9=f[B(+),Ib(+)]=MMF9(+)$$

$$F10=f[A(-),Ia(0)]=MMF10(0)$$

$$F11=f[C(+),Ic(-)]=MMF11(-)$$

$$F12=f[B(-),Ib(+)]=MMF12(-)$$

The magnetic fields of all phase A coils collapses, however, the current in phase B increases to carry the full stator current with phase C. The net sum of the magnitudes of the magnamotive forces remains constant provided the current to the motor is held constant and the voltage is allowed to vary as necessary to maintain the current.

Performing the second switching function, Ia=Ia(−)

$$F1=f[A(+),Ia(-)]=MMF1(-)$$

$$F2=f[C(-),Ic(-)]=MMF2(+)$$

$$F3=f[B(+),Ib(+)]=MMF3(+)$$

$$F4=f[A(-),Ia(-)]=MMF4(+)$$

$$F5=f[C(+),Ic(-)]=MMF5(-)$$

$$F6=f[B(-),Ib(+)]=MMF6(-)$$

$$F7=f[A(+),Ia(-)]=MMF7(-)$$

$$F8=f[C(-),Ic(-)]=MMF8(+)$$

$$F9=f[B(+),Ib(+)]=MMF9(+)$$

$$F10=f[A(-),Ia(-)]=MMF10(+)$$

$$F11=f[C(+),Ic(-)]=MMF11(-)$$

$$F12=f[B(-),Ib(+)]=MMF12(-)$$

The magnetic fields of phase A coils has now reversed polarity from the starting condition and phase A coils are now sharing the stator current with phase C coils. Phase B coils are carrying the full current of the stator. Note that the wave form of the MMF's has shifted one coil down the stator. Initially, the wave began at coil 114 but now starts at coil 115.

Taking the next phase in sequence, phase C, and driving it to null then reversing current polarity results in:

$$F1=f[A(+),Ia(-)]=MMF1(-)$$

$$F2=f[C(-),Ic(+)]=MMF2(-)$$

$$F3=f[B(+),Ib(+)]=MMF3(+)$$

$$F4=f[A(-),Ia(-)]=MMF4(+)$$

$$F5=f[C(+),Ic(+)]=MMF5(+)$$

$$F6=f[B(-),Ib(+)]=MMF6(-)$$

$F7=f[A(+),Ia(-)]=MMF7(-)$ $F8=f[C(-),Ic(+)]=MMF8(-)$ $F9=f[B(+),Ib(+)]=MMF9(+)$ $F10=f[A(-),Ia(-)]=MMF10(+)$ $F11=f[C(+),Ic(+)]=MMF11(+)$ $F12=f[B(-),Ib(+)]=MMF12(-)$

Again, the wave form of the MMF's has shifted one whole coil along the stator. Repeating the switching function for phase B yields:

$F1=f[A(+),Ia(-)]=MMF1(-)$ $F2=f[C(-),Ic(+)]=MMF2(-)$ $F3=f[B(+),Ib(+)]=MMF3(-)$ $F4=f[A(-),Ia(-)]=MMF4(+)$ $F5=f[C(+),Ic(+)]=MMF5(+)$ $F6=f[B(-),Ib(+)]=MMF6(-)$ $F7=f[A(+),Ia(-)]=MMF7(-)$ $F8=f[C(-),Ic(+)]=MMF8(-)$ $F9=f[B(+),Ib(-)]=MMF9(-)$ $F10=f[A(-),Ia(-)]=MMF10(+)$ $F11=f[C(+),Ic(+)]=MMF11(+)$ $F12=f[B(-),Ib(-)]=MMF12(+)$

Now the MMF wave has shifted one half cycle down the stator coils. The mover, having fixed poles, moves to stay magnetically aligned to the stator field.

The direction of travel of the mover can be reversed simply by reversing the switching cycle.

Figure 13:
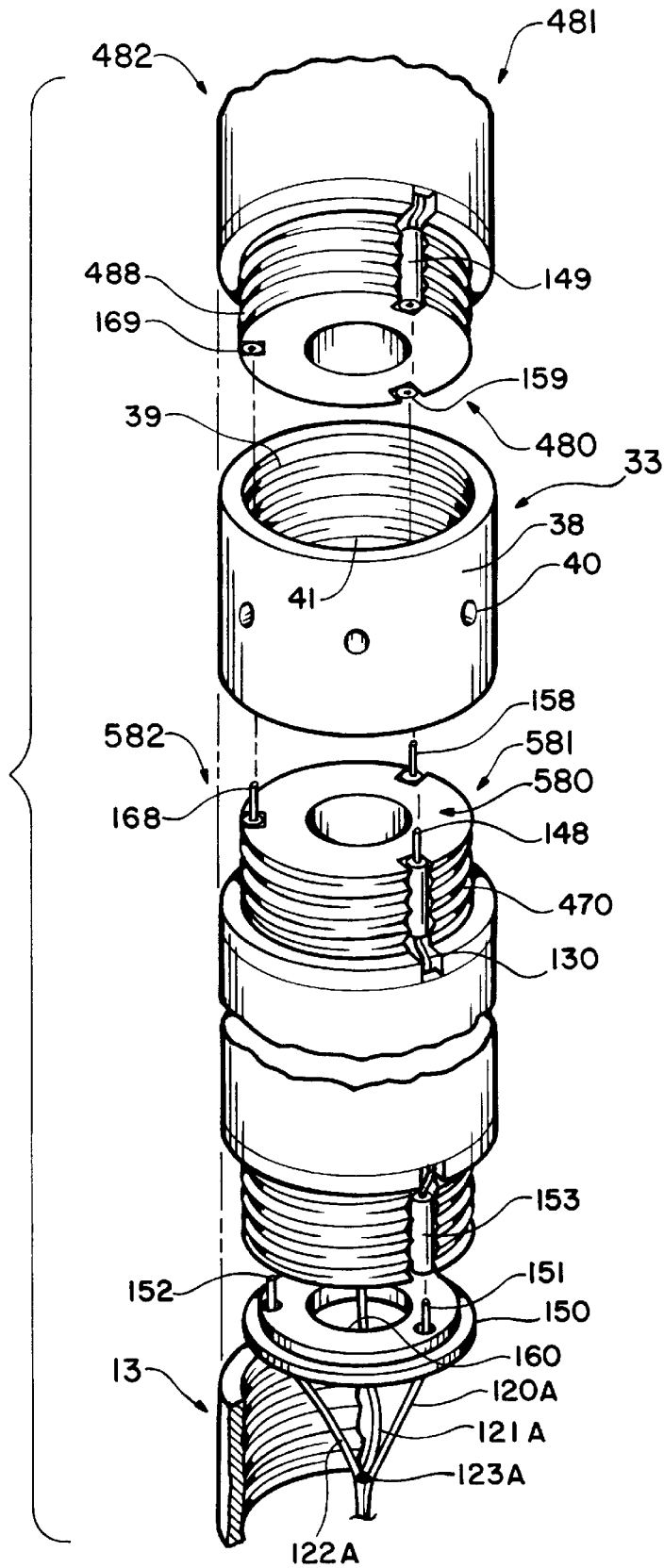
FIG. 13 is a greatly enlarged exploded pictorial view of a plurality of stator modules illustrating their end connectors.

Considering now the pin connector 150 in greater detail with reference to FIG. 13, the pin connector 150 is generally circular in shape having a centrally disposed opening 160 for enabling the mover to pass therethrough and includes a set of Y connected male pins, such as pins 151 and 152. The male pins, such as the pins 151 are adapted to be received in an associate female connector, such as the connector 153 at the bottom portion of the last stator module in the stator assembly.

Considering now the controller 19 in greater detail, the motor controller 19 provides the power and switching logic to operate the linear brushless direct current motor 15. For this application, the motor 15 and pump 13 are synchronized and the motor 15 only has to move to one end of its stroke, then reverse an move to the other end. It always travels the same distance in each direction as there is no need to position the mover 50 at any intermediate position. This makes the controller 19 a relative simple device.

The controller 19 consists of a power supply (not shown) a control logic module (not shown) with a counter (not shown) and an operator interface (not shown). The power supply is a constant current power supply with the current level being operator adjustable from zero to maximum current. Once set, the power supply will adjust the voltages to satisfy the current setting until the setting is changed to a new value by the operator. As the controller 19 is simple control logic, the detailed components of the controller 19 will not be described in greater detail.

The logic module utilizes silicon controlled rectifiers (SCR's) to control the power switching functions and the electronic counter to count the switching functions performed. In the earlier discussion on switching functions, two switching functions per coil were required to move the MMF wave one coil. The mover 50 has nineteen poles with each pole covering three coils for a total of 57 coils. The stator 30 has a total of 105 coils, which when considered with the mover 50, leaves a total of 48 coils not opposed by a mover pole. The coil pitch is one-half inch, or in other words, 48×½=24, the desired stroke to operate the pump. At two switching functions per coil and forty-eight coils to move over between stroke limits, there are a total of ninety-six switching functions to move the mover from one end of its stroke to the other.

On start-up, the mover 50 may be positioned at any arbitrary position in its stroke. When the system 9 is powered up, the switching logic moves the mover in one arbitrary direction for a preset number of switching function counts, about 100 which provides the 96 counts required plus 4 additional. When the mover 50 reaches its mechanical stops, it stops but the controller 19 continues the switching functions until the count of 100 is achieved. After it has reached its stops, the mover 50 is held tightly against them until the full count is reached. When the full count is reached, the controller 19 reverses the switching sequence and continues switching for 100 counts in the opposite direction. The control logic again reverses switching direction and the cycle is repeated.

The speed of the mover 50 is controlled by the frequency of the MMF waves formed on the stator 30. In this regard, any frequency between 0 and 6 Hertz can be selected. Since one wave length is six coils in length, the mover 50 will be travelling at thirty-six coils per second or 18 inches per second at a frequency of 6 Hertz.

A time delay can be included at each end of the stroke. The time delay at each end of the stroke is a separate input and the two delays can be different. They range from 0 to 10 seconds.

The force the motor can exert is controlled by setting the amperage that the power supply provides. Operating the motor at a lowest amperage which will provide reliable operation in order to reduce the power required to operate the pump and the heat generated in the motor operating at a lower amperage will increase the life of the motor.

When the motor 15 is operating, an electrical current is always flowing in some or all of the stator coils. The current in the coils develops heat in accordance with the relation the heat generated is equal to the product of the coil resistance times the square of the current. Since the electrical switching occurs in milliseconds while heat time constants are measured in minutes or hours, the mean current over a cycle is a more accurate model to use for calculating the heat developed in the motor. The mean current in any one phase or coil is ⅔ the motor current; hence, the heat generated in any coil is:

$$Q=(4/9)*Im*Im*Rc$$

where

Im=motor current

Rc coil resistance.

The motor 15 is designed to eliminate heat in a down hole environment. When in place in the production tubing, the first barrier between the coil and the outside of the motor is the yoke which is a thin walled steel tube on the order of 1/16 inches thick. The annular space between the motor and the tubing is filled with well fluid, generally some oil-water mixture which has good thermal conductivity. The annular space is only 10–12 thousandths clearance, therefore, the free convection cannot occur and the fluid will behave as a solid conductor in that space. The production tubing is the next barrier however it is steel having good thermal conductivity to dissipate the heat from the motor. The annular space between the production tubing and the well casing is filled with the well fluid. In this case, there may be sufficient clearance between the wall of the well casing and the production tubing for free convection currents to establish themselves. The heat path between the stator coils and the earth outside the well casing is conductive to conducting the heat generated in the motor away from the motor at a high rate.

In addition to the heat dissipated to the well via the yoke on the outside of the motor, heat is transferred across the thin inner tubular bore of the stator teeth to the mover. This path has less surface area to conduct the heat away from the coils than the yoke, however, a significant proportion of the total generated heat may be dissipated this way. The heat path is from the coil, through the thin inner tube of the stator teeth, through a thin sheet of well fluid, through the samarium cobalt magnets and the steel mover shaft and into the pumped fluid. Aside from the thin fluid lubrication sheet between the mover and the stator bore, the path is of conductive materials. The pumped fluid in the mover bore is continually being replaced with new fluid as the well is pumped. Once the fluid flows out of the motor it goes into the production tubing which has a large surface from which to transfer heat.

Considering now the coupling of stator modules 21 and 23 in greater detail with reference to FIGS. 8 and 13, the terminal ends of the three phase winding wires 120–122 of the stator module 21 extend out their respective wire way channels such as the wire way channels 480–482 and terminate in their respective connector pins, such as the connector pins 149, 159 and 169, respectively, disposed at the bottom terminal end portion of the stator unit 21. A similar set of winding wires 130–132 extend out of their respective wire way channels 580–582 at the terminal end of module 23. The wires 130–132 terminate in a set of female connectors, such as the female connector 148, 158 and 168, respectively, disposed in the upper terminal end portion of the other stator module 23. As will be explained hereinafter, the terminal ends of the windings 120–122 are connected or joined together in their proper phase relationships with the windings 130–132 by the connector 150 as best seen in FIG. 13. In this regard, the connector 150 includes three conductors 120A–122A interconnected via a common node 123A.

Considering now the coupling 33 in greater detail with reference to FIGS. 3 and 8, the coupling 33 is generally tubular in shape having an outer wall 38. A set of spanner holes, such as a hole 40, are equally spaced apart around the outside of the wall 38 to enable the coupler to be torqued during assembly by means of a spanner wrench (not shown). The interior of the wall 38 is threaded on one end with a left handed thread 41 for receiving a left handed threaded nipple, such as the nipple 470 extending from the upper portion of module 21. The other end of the interior of the wall 38 is threaded with a right handed thread 39 for receiving a right hand threaded nipple, such as the nipple 488 extending from the lower portion of module 21. As best seen in FIGS. 7 and 8, the distance $D_1$ from the center of the phase B winding at the terminal end of module 21 and the center of phase A winding at the terminal end of the other module 23 is equal to a distance $D_2$ of about 6 pole pitch. In this regard, the coupling 33 has an axial length that maintains the pole pitch between the stator modules 21 and 23.

Considering now the pump 13 in greater detail with reference to FIGS. 1 and 2, the pump 13 generally includes an outer barrel or housing 80 adapted to be coupled mechanically to the motor stator by a coupling 18A and a centrally disposed hollow plunger 82 having a traveling discharge valve 84 disposed there within. The plunger 82 is adapted to be coupled mechanically to the motor mover 50 by a coupler 55 so that fluids displaced by the pump 13 can be received within the motor 15 for cooling purposes. In this arrangement, the motor mover 50 and the pump plunger 82 move together in unison. More specifically, the motor mover 50 and the pump plunger 82 are so constructed to have the same operating stroke which allows the pump plunger to operate at a high swept volume ration or volumetric efficiency. Thus, as the stroke of the motor 15 is substantially equal to the stroke of the pump 13, it is very difficult, if not impossible to form gas bubbles in the suction chamber 88, thus, substantially preventing low pressure fluids from entering into the chamber 88 to cause gas lock.

An intake or stationary standing valve 86 disposed at the base or bottom of the pump 13 enables fluids 10 to be received into a suction chamber or sleeve cavity 88 of the pump 13 and thence transferred into the mover 50 via the pump plunger 82.

From the foregoing, those skilled in the art will understand the pump 13 operates much like a sucker rod pump. In this regard, the plunger 82 seals against a pump sleeve bore with a metallic seal so that as the plunger 82 is raised by the mover 50, the fluids disposed above the plunger 82 are lifted up into the mover 50 and into the production tubing.

The sleeve bore below the plunger 82 is evacuated by the upper movement of the plunger and thus, well fluid is drawn into the suction chamber 88 through the stop valve 86 as shown in FIG. 1. When the plunger 82 reaches the top of its stroke, the mover 50 reverses direction and drives the plunger downwardly toward the fluids in the well. The well fluids in the suction chamber 88 is trapped between the plunger seal and the stop valve 86 at the bottom of the pump 13 as shown in FIG. 2.

The stop valve 86 allows fluids to flow into the suction chamber 88 but blocks flow out of the chamber 88, hence, the fluid trapped in the suction chamber is forced up the plunger bore and up through the traveling stop valve 84 in the upper portion of the plunger 82. At the bottom of the stroke, the motor 15 again reverses direction and the pumping cycle is repeated.

From the foregoing, it should also be understood by those skilled in the art that the suction chamber 88 and plunger 82 may be replaced with a sleeve and plunger of a different size to increase or decrease pumping capacity as may be required. The pump housing 80, pump motor coupling 18A, the pump external seal 18 and valves 84, 86 are all reasonable and interchangeable with a new plunger-sleeve set. Thus, the ability to change the pump bore provides a convenient method to adjust the pump 13 for different volume and pressure capacity to meet the needs of different wells.

As the pump plunger 82 is connected directly to the mover 50 it must move in unison with the mover 50. In this regard, the mover 50 has a precisely controlled stroke which extends to the pump stroke. With the controlled stroke, the swept volume of the pump piston for the pump 13 can be increased and a short stroke of only about twenty four inches is required. This shorter stroke over conventional sucker rod pump strokes of ten to fifteen feet, permits the overall length of the pump to be substantially short or about fifty-six inches. This increase in the volumetric efficiency improves the overall efficiency of the pump and greatly reduces the potential for gas lock.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of constructing a linear motor comprising:

using at least two like elongated cylindrically shaped hollow stator modules, each stator module having spaced apart oppositely threaded end segments axially disposed thereon;

each stator module further having a plurality of spaced apart stator coils extending throughout its entire axial length for defining a given three phase stator pole pitch of a given axial length;

interconnecting said at least two like stator modules with an elongated cylindrically shaped hollow stator coupler having an interior threaded wall, said wall having one portion adapted to engage threadably one of the oppositely threaded end segments of a stator module and another portion of said wall being adapted to engage threadably an opposite one of the oppositely threaded end segments of another stator module;

said stator coupler having an axial length of sufficient dimension to maintain said given three phase pole pitch between interconnected stator modules;

using at least two like elongated cylindrically shaped hollow mover modules, each mover module having a hollow shaft with spaced apart like poled ring shaped permanent magnets mounted thereon and disposed on diametrically opposite ends thereof;

each mover module further having a plurality of spaced apart oppositely poled ring shaped permanent magnets mounted on said shaft disposed between said spaced apart like poled permanent magnets for defining a series of alternating magnetic mover poles;

each mover module further having a plurality of ring shaped bearing units mounted on said shaft and interleaved with said permanent magnets for helping to equally space them apart throughout the entire axial length of the mover module;

interconnecting said at least two like mover modules with an elongated cylindrically shaped hollow mover coupler having an interior threaded wall with an upper portion and a lower portion, said upper portion for threadably coupling one of the mover modules and said lower portion for threadably coupling another one of the mover modules;

said mover coupler having an axial length of sufficient dimension to maintain the mover pole pitch between interconnected mover modules; and placing the interconnected mover modules in the hollow interior of the interconnected stator modules to enable them to interact electromagnetically.

2. In a motor construction, a method of constructing a linear motor stator, comprising:

using at least two like elongated cylindrically shaped hollow stator modules, each stator module having spaced apart oppositely threaded end segments disposed on diametrically opposite ends thereof;

each stator module further having a plurality of spaced apart stator coils extending throughout its entire axial length for defining a given three phase stator pole pitch of a given axial length;

interconnecting said at least two like stator modules with an elongated cylindrically shaped hollow stator coupler having an interior threaded wall, said wall having one portion adapted to engage threadably one of the oppositely threaded end segments of a stator module and another portion of said wall being adapted to engage threadably an opposite one of the oppositely threaded end segments of another stator module; and said stator coupler having an axial length of sufficient dimension to maintain said given three phase pole pitch between interconnected stator modules.

3. In a motor construction, a method of constructing a linear motor mover, comprising:

using at least two like elongated cylindrically shaped hollow mover modules, each mover module having a hollow shaft with spaced apart like poled ring shaped permanent magnets mounted thereon and disposed on diametrically opposite ends thereof;

each mover module further having a plurality of spaced apart oppositely poled ring shaped permanent magnets mounted on said shaft disposed between said spaced apart like poled permanent magnets for defining a series of alternating magnetic mover poles;

each mover module further having a plurality of ring shaped bearing units mounted on said shaft and interleaved with said permanent magnets for helping to equally space them apart throughout the entire axial length of the mover module;

interconnecting said at least two like mover modules with an elongated cylindrically shaped hollow mover coupler having an interior threaded wall with an upper portion and a lower portion, said upper portion for threadably coupling one of the mover modules and said lower portion for threadably coupling another one of the mover modules;

said mover coupler having an axial length of sufficient dimension to maintain the mover pole pitch between interconnected mover modules; and placing the interconnected mover modules in the hollow interior of the interconnected stator modules.

4. In a motor construction, a method of constructing a linear motor stator, comprising:

using at least two like elongated cylindrically shaped hollow stator modules, each stator module having spaced apart oppositely threaded end segments disposed on diametrically opposite ends thereof;

each stator module further having a plurality of spaced apart stator coils extending throughout its entire axial length for defining a given three phase stator pole pitch of a given axial length;

interconnecting said at least two like stator coupler having an interior threaded wall, said wall having one portion adapted to engage threadably one of the oppositely threaded end segments of a stator module and another portion of said wall being adapted to engage threadably an opposite one of the oppositely threaded end segments of another stator module; and said stator coupler having an axial length of sufficient dimension to maintain said given three phase pole pitch between interconnected stator modules; and producing a plurality of substantially like hollow inner tubular root members, each member having a pair of half stator teeth disposed on opposite terminal ends of the member and a plurality of spaced part full teeth members disposed between said half teeth for defining a given number of spaced apart coil receiving slots extending throughout the entire axial length of the inner member;

producing an upper hollow outer tubular root member having an upper half stator tooth member disposed on one of its terminal ends and a right hand threaded end portion disposed on its other terminal end;

said upper member having a plurality of spaced part full tooth members disposed between said upper half tooth member and said right had threaded end portion for defining another given number of spaced apart coil receiving slots extending throughout the entire axial length of the upper member;

producing a lower hollow outer tubular root member having a lower half stator tooth member disposed on one of its terminal ends and a left hand threaded end portion disposed on its other terminal end;

said lower member having a plurality of spaced part full tooth members disposed between said lower half tooth member and said left hand threaded end portion for defining yet another given member of spaced part coil receiving slots extending throughout the entire axial length of the lower member;

assembling together in a stack a given number of said substantially like hollow inner tubular root members;

assembling one terminal end of said stack of inner root members to the half stator tooth of said upper hollow outer root member to form a full stator tooth;

assembling the other terminal end of said stack of inner root members to the half stator tooth of said lower hollow outer root member to form another full stator tooth;

forming a phase A winding in every third coil receiving slot with a single phase A wire, each one of said phase A winding being substantially ring shaped;

forming a phase B winding in ever third coil receiving slot adjacent to a phase A winding with a single phase B wire, each one of said phase B winding being substantially ring shaped;

forming a phase c winding in every third coil receiving slot adjacent to phase B winding with a single phase C wire; each of said phase C windings being substantially ring shaped;

mounting a hollow tubular yoke member over the assembled hollow inner tubular members and upper and lower tubular members to form one of said at least two like stator threaded end portion extending from one terminal end thereof and said left hand threaded end portion extending from the other terminal end thereof.

5. A method according to claim 4, wherein said step of using at least two like stator modules further includes:

repeating said steps of assembling, assembling, assembling, forming, forming, forming and mounting another hollow tubular yoke member over the last mentioned assembled hollow inner tubular members and upper and lower tubular members to form another one of said at least two yoke stator modules, said another stator module having said right hand threaded end portion extending from one terminal end thereof and said left hand threaded end portion extending from the other terminal end thereof.

6. A modular tubular linear motor for use in an elongated hollow ferromagnetic tube, comprising:

a plurality of elongated like mover segments each having a plurality of equally spaced apart pairs of oppositely poled permanent magnets disposed between and equally spaced apart from a pair of like poled permanent magnets for generating a plurality of equally spaced apart pairs of oppositely poled magnetic flux fields;

each individual one of said permanent magnets being generally ring shaped, radially polarized, and having a given longitudinal dimension l;

coupler means disposed between abutting pairs of said like poled permanent magnets for mechanically interconnecting said plurality of mover segments together to define a modular mover having an axial length L, said coupler means having a longitudinal dimension substantially equal to l for spacing the abutting pairs of like poled permanent magnets a sufficient distance to help maintain mover pole pitch throughout the entire axial length L of said modular mover;

a plurality of elongated like stator segments each having a plurality of equally spaced apart pairs of oppositely wound coils for generating a plurality of equally spaced apart pairs of magnetic fields having opposite polarities;

each individual one of said stator segments having a plurality of sets of equally spaced apart like sized ring shaped stator teeth each having a longitudinal dimension, each set being disposed between a pair of half sized ring shaped stator teeth, said half sized teeth each having one-half the longitudinal length of said like sized teeth, and a pair of spaced apart male and female couplers each having another plurality of equally spaced apart like sized stator teeth and a single half size stator tooth substantially equal in dimension to an individual one of said pair of half sized teeth;

wherein individual ones of said pair of half sized teeth and a corresponding individual ones of said single half size stator teeth are abutted together to form a full size tooth for helping to maintain stator pole pitch through the entire axial length of said segments;

wherein said pairs of spaced apart male and female couplers are interconnected with corresponding ones of the respective female and male couplers of other ones of said like stator segments to define a modular stator terminating at one of its ends in a single one of the male couplers and at its opposite end in a single one of the female couplers; and whereby said single one of the male couplers is adapted to be mechanically and electrically connected to a source of power for electrically energizing the motor.

7. A modular tubular linear motor for use in an elongated hollow ferromagnetic tube, comprising:

upper elongated mover means having a pair of upper like poled permanent magnets mounted at opposite ends thereof and a plurality of equally spaced apart pairs of oppositely poled upper permanent magnets mounted between and equally spaced apart from said pair of upper like poled magnets for generating pairs of oppositely poled upper magnetic flux fields;

lower elongated mover means having a pair of lower like poled permanent magnets mounted at opposite ends thereof and a plurality of equally spaced apart pairs of oppositely poled lower permanent magnets mounted between and equally spaced apart from said pair of lower like poled magnets for generating pairs of oppositely poled lower magnetic flux fields;

mover coupler means for coupling mechanically said upper and lower mover means together to define a modular mover having an axial length L;

said mover coupler means, said upper and lower oppositely poled magnets and said upper and lower like poled magnets each having substantially the same longitudinal dimension for helping to maintain phasing across pairs of upper and lower mover means;

elongated hollow stator stack tube means having a sufficient diameter to be received with said ferroelectric tube for interacting electromagnetically with it to help produce a motor thrust of a given force;

said stator stack means including yoke means having a sufficient axial length to receive said modular mover therewithin for free relative movement;

upper elongated hollow stator means mounted mechanically within said yoke means for generating a plurality of pairs of oppositely poled equally spaced apart upper electromagnetic fields to interact with said upper and lower magnetic flux fields to cause said modular mover to move rectilinearly reciprocatively within said stator stack means;

lower elongated hollow stator means mounted mechanically within said yoke means for generating a plurality of pairs of oppositely poled equally spaced apart lower electromagnetic fields to interact with said lower and lower magnetic flux fields to cause said modular mover to move rectilinearly reciprocatively within said stator stack means;

stator coupling means for coupling mechanically said upper and lower stator means together to define a modular stator having an axial length substantially the same as said axial length L;

said stator coupling means, said upper stator means and said lower stator means each having substantially the same longitudinal dimension for helping to maintain phasing across pairs of upper and lower stator means; and said stator coupling means, said upper stator means, said lower stator means further each having a centrally disposed thin hollow ferroelectric tube of sufficient diameter to receive said modular mover therewithin for free relative movement.

8. A modular tubular linear motor according to claim 7, further comprising:

end connector means having three conductors connected together via a common node to form a Y connection.

9. A modular tubular linear motor for use in an elongated hollow ferromagnetic tube, comprising:

top elongated tube means for defining a plurality of magnetic flux paths coupled electromagnetically to a corresponding plurality of magnetic flux paths established in the ferromagnetic tube;

a top pair of spaced apart like poled permanent magnets mounted at opposite ends of said top tube means for generating a pair of like poled magnetic flux fields;

a top plurality of equally spaced apart pairs of oppositely poled permanent magnets mounted on said top tube means and equally spaced apart from said top pair of like poled permanent magnets for generating a plurality of pairs of oppositely poled magnetic flux fields;

bottom elongated tube means for defining a plurality of magnetic flux paths coupled electromagnetically to a corresponding plurality of magnetic flux paths established in the ferromagnetic tube;

a top pair of spaced apart like poled permanent magnets mounted at opposite ends of said bottom tube means for generating a pair of like poled magnetic flux fields;

a bottom plurality of equally spaced apart pairs of oppositely poled permanent magnets mounted on said bottom tube means and equally spaced apart from said bottom pair of like poled permanent magnets for generating a plurality of pairs of oppositely poled magnetic flux fields;

coupler means for coupling said top permanent magnets and said bottom permanent magnet together to define a modular mover having an axial length L;

said coupler means, said top and bottom like poled magnets and said oppositely poled magnets each having substantially the same longitudinal dimension;

elongated ferromagnetic yoke tube means having a sufficiently large diameter to be received within the ferromagnetic tube;

elongated upper stator means coupled mechanically to said yoke tube means for coupling electrically to power means to facilitate the establishment of a plurality of upper electromagnetic fields to interact with the magnetic fields produced by certain ones of said top and bottom permanent magnets to cause said modular mover means to move rectilinearly reciprocatively along a mover path of travel having a given axial length l;

elongated lower stator means mechanically coupled to said yoke tube means and to said upper stator means for cooperating with said upper stator means to cause said modular mover means to move rectilinearly reciprocatively along said mover path of travel;

said upper stator means and said lower stator means each being substantially identical and each including:

top end stator tube means coupled mechanically to said yoke tube means and having a sufficiently large longitudinal dimension for receiving a top portion of said modular mover therewithin for free relative movement;

both end stator tube means coupled mechanically to said yoke tube means and having substantially the same first mentioned longitudinal dimension for receiving a bottom portion of said modular mover therewithin for free relative movement;

elongated middle stator tube means disposed with said yoke tube means between said top and bottom tube means and having substantially the same first mentioned longitudinal dimension for receiving a middle portion of said modular mover therewithin for free relative movement;

top connector means mounted on said to end stator tube means for mechanically and electrically coupling to said power means and having a plurality of equally spaced apart top end stator teeth including a top segment stator tooth disposed at a distal end of said top end stator tube means for helping to define a given number of top coil receiving slots;

bottom connector means mounted on said bottom end stator tube means for mechanically and electrically coupling to said power means and having a plurality of equally spaced apart bottom end stator teeth including a bottom segment stator tooth disposed at a distal end of bottom end stator tube means for helping to define a given number of bottom coil receiving slots;

a pair of spaced apart like stator teeth mounted on opposite ends of said middle stator tube for abutting said top segment stator tooth and said bottom segment stator tooth respectively to form a pair of middle stator teeth having substantially like dimensions to individual ones of said top end and said bottom end stator teeth for helping to maintain stator pole pitch;

a plurality of equally spaced apart intermediate stator teeth mounted along said middle stator tube means between said middle stator teeth for helping to define a given number of middle coil receiving slots;

phase A conductor means mounted continuously within selected axially spaced apart ones of said top, bottom and middle coil receiving slots for defining a plurality of equally spaced apart pairs of oppositely wound phase A coils;

phase B conductor means mounted continuously within selected axially spaced apart other ones of said top, bottom and middle coil receiving slots for defining a plurality of equally spaced apart pairs of oppositely wound phase B coils;

phase C conductor means mounted continuously within the remaining axially spaced apart ones of said top, bottom and middle coil receiving slots for defining a plurality of equally spaced apart pairs of oppositely wound phase C coils;

means for connecting electrically one set of ends of said phase A, phase B, and phase C conductor means to form a common node therebetween; and means at the other end of said phase A, phase B, and phase C conductor means for coupling them electrically to said power source.

* * * * *

UNITED STATES PATENT AND TRADEMARK OFFICE
CERTIFICATE OF CORRECTION

PATENT NO. : *5,831,353*
DATED : *November 3, 1998*
INVENTOR(S) : *Vance E. Bolding and William M. Halliday*

It is certified that error appears in the above-identified patent and that said Letters Patent is hereby corrected as shown below:

Title page, item [21], *Application Number should be 08/540,936 not 540,936*

*Column 26, Line 10    change "1" to "ℓ"*

*Column 26, Line 16    change "1" to "ℓ"*

*Column 28, Line 27    change "1" to "ℓ"*

Signed and Sealed this

Ninth Day of May, 2000

Attest:

Q. TODD DICKINSON

*Attesting Officer*     *Director of Patents and Trademarks*